(12) United States Patent
Samain et al.

(10) Patent No.: US 11,028,937 B2
(45) Date of Patent: Jun. 8, 2021

(54) VALVE WITH SHAPE MEMORY ALLOY WIRE

(71) Applicant: L&P PROPERTY MANAGEMENT COMPANY, South Gate, CA (US)

(72) Inventors: Maxime Samain, Harelbeke (BE); Bradley Michael James Morris, Windsor (CA); Milosz Niec, Tecumseh (CA); Sigurd Sturm, Nuremberg (DE); Horia Blendea, LaSalle (CA); Wade O'Moore, Belle River (CA); Krzysztof Zulauf, Windsor (CA); Jianlin Zhang, Windsor (CA); Martin Kalmutzki, Schwabach (DE)

(73) Assignee: L&P PROPERTY MANAGEMENT COMPANY, South Gate, CA (US)

( * ) Notice: Subject to any disclaimer, the term of this patent is extended or adjusted under 35 U.S.C. 154(b) by 0 days.

(21) Appl. No.: 16/470,530

(22) PCT Filed: Dec. 29, 2017

(86) PCT No.: PCT/EP2017/084840
§ 371 (c)(1),
(2) Date: Jun. 17, 2019

(87) PCT Pub. No.: WO2018/122387
PCT Pub. Date: Jul. 5, 2018

(65) Prior Publication Data
US 2020/0088314 A1    Mar. 19, 2020

(30) Foreign Application Priority Data

Dec. 29, 2016  (EP) .................................... 16207317

(51) Int. Cl.
*F16K 31/02*    (2006.01)
*F03G 7/06*    (2006.01)
(Continued)

(52) U.S. Cl.
CPC ............ *F16K 31/025* (2013.01); *F03G 7/065* (2013.01); *F16K 11/14* (2013.01); *B60N 2/914* (2018.02)

(58) Field of Classification Search
CPC ........ F16K 31/025; F16K 11/14; F03G 7/065; B60N 2/914
See application file for complete search history.

(56) References Cited

U.S. PATENT DOCUMENTS 4,548,041 A * 10/1985 Taylor ..................... F01L 29/08
60/371
4,674,398 A * 6/1987 Taylor ..................... F01L 29/08
251/11
(Continued)

FOREIGN PATENT DOCUMENTS

DE    102006053147 A1    5/2007
DE    102015201534 B3    4/2016
(Continued)

OTHER PUBLICATIONS

International Search Report and Written Opinion for Application No. PCT/EP2017/084840 dated Apr. 17, 2018 (17 pages).
(Continued)

*Primary Examiner* — Umashankar Venkatesan
(74) *Attorney, Agent, or Firm* — Michael Best & Friedrich LLP

(57) ABSTRACT

A valve (100) includes a housing (111) and the fluid port (121). A plunger (125) is configured to seal the fluid port (121) in a first position (91) and to unseal the fluid port (121) in a second position and to displace along a displacement direction (259) from its first position (91) towards its second position. The valve (100) also includes at least one shape memory alloy, SMA, actuator (151, 152) extending along the displacement direction (259) for at least 50% of its length and configured to exert an actuation force (155) on
(Continued)

the plunger (125) to displace the plunger (125) from the first position (91) towards the second position.

31 Claims, 19 Drawing Sheets

(51) Int. Cl.
*F16K 11/14* (2006.01)
*B60N 2/90* (2018.01)

(56) References Cited

U.S. PATENT DOCUMENTS

| | | | |
|---|---|---|---|
| 4,973,024 A * | 11/1990 | Homma | F16K 31/002 137/594 |
| 7,744,059 B2 | 6/2010 | Jerg | |
| 7,815,161 B2 | 10/2010 | Saitoh et al. | |
| 8,499,779 B2 * | 8/2013 | Gillespie | F16K 31/002 137/15.18 |
| 9,186,853 B2 | 11/2015 | Khan et al. | |
| 10,066,756 B2 * | 9/2018 | Sohn | F16K 31/025 |
| 2002/0112788 A1 | 8/2002 | Tanaka et al. | |
| 2010/0139785 A1 * | 6/2010 | Saitoh | F16K 99/0001 137/468 |
| 2012/0067430 A1 | 3/2012 | Deperraz et al. | |
| 2012/0199768 A1 | 8/2012 | Love et al. | |
| 2014/0103232 A1 | 4/2014 | Deperraz | |
| 2018/0023906 A1 | 1/2018 | Tajiri et al. | |
| 2019/0003609 A1 * | 1/2019 | Asai | F16K 31/002 |

FOREIGN PATENT DOCUMENTS

| | | | |
|---|---|---|---|
| DE | 102014225756 A1 | 6/2016 | |
| DE | 102016225519 A1 * | 6/2018 | F03G 7/065 |
| EP | 1619287 A1 | 1/2006 | |
| EP | 1909008 A1 | 4/2008 | |
| EP | 2078891 A2 | 7/2009 | |
| EP | 2740521 A1 | 6/2014 | |
| EP | 2860401 A2 | 4/2015 | |
| JP | 2006125445 A * | 5/2006 | F16K 31/025 |
| JP | 4091035 B2 | 5/2008 | |
| WO | 2014135909 A1 | 9/2014 | |
| WO | 2015185132 A1 | 12/2015 | |
| WO | 2018/049526 A1 | 3/2018 | |

OTHER PUBLICATIONS

G.RAU Innovative Metalle, "Thermal Actuators," 12 pages, retrieved Apr. 7, 2019.

* cited by examiner

VALVE WITH SHAPE MEMORY ALLOY WIRE

TECHNICAL FIELD

Various examples relate to actuating a plunger of a valve using a shape memory alloy actuator. Various examples relate to an operating range of a shape memory alloy actuator for actuating the plunger.

BACKGROUND

Valves to switch a fluid flow are employed in various fields including automotive seating. Here, an example application includes switching the flow of pressurized air to implement functions such as lumbar support, bolster adjustment, and massage.

Traditionally, such valves are implemented using solenoid technology. However, respective valves are comparably bulky and heavy and, furthermore, cause a significant noise level during operation.

To overcome these issues, valves are sometimes equipped with an actuator employing a shape memory alloy (SMA) wire.

For example, a normally-open valve using a SMA wire is known from U.S. Pat. No. 7,815,161 B2. However, normally-open valves using SMA wires typically face the drawback that it is difficult to protect the SMA wire against overstress once the plunger of the valve seals the fluid port. Comparably complex designs may be required to implement an overstress protection.

Therefore, normally-closed valves are sometimes employed. An example is known from WO 2015/185 132 A2. Here, a lever-type mechanism is employed to translate the length change of the SMA wire into a displacement of the plunger.

However, SMA-actuated normally-closed valves according to reference implementations face certain restrictions and drawbacks. For example, these valves can be comparably complex and require many parts. Further, the respective valves can use housings having large dimensions such that they are difficult to integrate.

SUMMARY

Therefore, a need exists for advanced techniques of actuating valves employing a SMA wire. In particular, a need exists for such techniques which overcome or mitigate at least some of the above-identified restrictions and drawbacks.

This need is met by the features of the independent claims. The features of the dependent claims define embodiments.

According to an example, a valve includes a housing and a fluid port arranged in the housing. The valve also includes a plunger configured to seal the fluid port in a first position and to unseal the fluid port in a second position. The plunger is further configured to displace along the displacement direction from its first position towards its second position. The valve further includes at least one SMA actuator which extends along the displacement direction for at least 50% of its length. The SMA actuator is configured to exert an actuation force on the plunger to displace the plunger from the first position towards the second position.

According to an example, a seat includes a valve. The valve includes a housing and a fluid port arranged in the housing. The valve also includes a plunger configured to seal the fluid port in a first position and to unseal the fluid port in a second position. The plunger is further configured to displace along the displacement direction from its first position towards its second position. The valve further includes at least one SMA actuator which extends along the displacement direction for at least 50% of its length. The SMA actuator is configured to exert an actuation force on the plunger to displace the plunger from the first position towards the second position.

For example, the seat may be an automotive seat or an airplane seat. For example, the seat may include one or more fluid bladders. It is possible that the valve is used to switch the fluid flow to one or more fluid bladders.

According to an example, a system includes a housing, a first valve, and the second valve. The first valve includes a fluid port arranged in the housing, a plunger configured to seal the fluid port of the first valve in a first position and to unseal the fluid port of the first valve in a second position, and at least one SMA actuator configured to exert an actuation force on the plunger of the first valve to displace the plunger of the first valve from its first position towards its second position. The second valve includes a fluid port arranged in the housing, a plunger configured to seal the fluid port of the second valve in a first position and to unseal the fluid port of the second valve in a second position, and at least one SMA actuator configured to exert an actuation force on the plunger of the second valve to displace the plunger of the second valve from its first position towards its second position. The valve system also includes a fluid flow path between the first valve and the second valve. The SMA actuator of the first valve and the SMA actuator of the second valve may enclose an angle of not more than 50° with respect to each other.

According to an example, a seat includes a valve system. The valve system includes a housing, a first valve, and the second valve. The first valve includes a fluid port arranged in the housing, a plunger configured to seal the fluid port of the first valve in a first position and to unseal the fluid port of the first valve in a second position, and at least one SMA actuator configured to exert an actuation force on the plunger of the first valve to displace the plunger of the first valve from its first position towards its second position. The second valve includes a fluid port arranged in the housing, a plunger configured to seal the fluid port of the second valve in a first position and to unseal the fluid port of the second valve in a second position, and at least one SMA actuator configured to exert an actuation force on the plunger of the second valve to displace the plunger of the second valve from its first position towards its second position. The valve system also includes a fluid flow path between the first valve and the second valve. The SMA actuator of the first valve and the SMA actuator of the second valve may enclose an angle of not more than 50° with respect to each other.

For example, the seat may be an automotive seat or an airplane seat. For example, the seat may include one or more fluid bladders. It is possible that the valve is used to switch the fluid flow to the one or more fluid bladders.

According to an example, a valve includes a housing, a fluid port arranged in the housing, and a plunger configured to selectively seal the fluid port. The valve also includes a SMA actuator made of a Nickel-Titanium alloy and configured to actuate the plunger by transitioning between a contracted state and an elongated state. The valve is configured to operate the SMA actuator at stresses of not less than 160 MPa, optionally of not less than 173 MPa, further optionally of not less than 270 MPa.

According to an example, a seat includes a valve. The valve includes a housing, a fluid port arranged in the housing, and a plunger configured to selectively seal the fluid port. The valve also includes a SMA actuator made of a Nickel-Titanium alloy and configured to actuate the plunger by transitioning between a contracted state and an elongated state. The valve is configured to operate the SMA actuator at stresses of not less than 160 MPa, optionally of not less than 173 MPa, further optionally of not less than 270 MPa.

For example, the seat may be an automotive seat or an airplane seat. For example, the seat may include one or more fluid bladders. It is possible that the valve is used to switch the fluid flow to the one or more fluid bladders.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 1 schematically illustrates a valve including a SMA wire to actuate a plunger according to various examples, wherein FIG. 1 illustrates the plunger in the closed position.

FIG. 2 schematically illustrates the valve according to the example of FIG. 1, wherein FIG. 2 illustrates the plunger in the opened position.

FIG. 6 illustrates the force profile of a bias force exerted on the plunger by a resilient member according to various examples, wherein FIG. 6 illustrates a forward force profile and a reversed force profile.

FIG. 7 is a perspective view of a valve according to various examples, wherein FIG. 7 illustrates a scenario where the resilient member is implemented by a leaf spring.

DETAILED DESCRIPTION OF EMBODIMENTS

Figure 1:
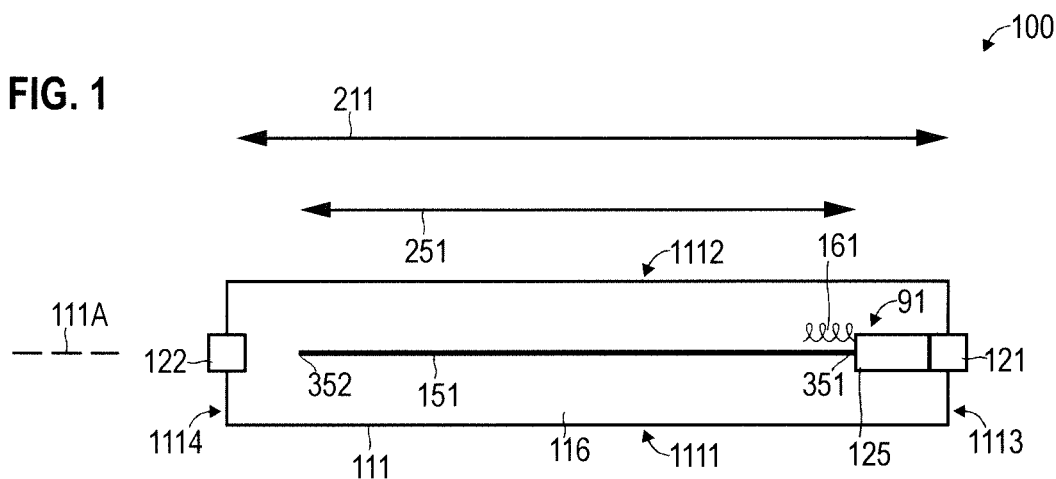

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of switching a fluid flow are described. The fluid may be a gas or a liquid. To switch the fluid flow, a valve is employed. The valve includes a fluid port and a plunger. The plunger (sometimes also referred to as piston) is configured to selectively seal the fluid port. The plunger may include a sealing surface for this purpose. For example, the plunger may fully seal the fluid port in a first position (closed position) and fully unseal the fluid port in a second position (opened position). In other examples, also an intermediate position is conceivable where the plunger partially seals the fluid port, i.e., provides a certain flow resistance to the fluid. An example technique to reliably position the plunger in the intermediate position includes using a pulse-width modulated heating current applied to the SMA actuator using logic to set the duty cycle depending on the desired degree of flow resistance.

To displace the plunger, an actuator is employed. The actuator displaces the plunger between the opened position and the closed position. The plunger moves between the closed position and the opened position along a displacement direction.

The valves described herein may find application in various fields. For example, the valves may be employed in seats, e.g., office chairs or automotive seats. Here, bladders in the seats may be selectively filled with pressurized air. This increases the seating comfort. Massage functionality may be possible.

For example, a control unit may be provided which is configured to control the actuation of the valve. The control unit may be implemented by a microcontroller, a field-programmable array (FPGA), or an application-specific integrated circuit (ASIC).

According to examples, the actuator is implemented by an SMA actuator. For example, the SMA actuator may be implemented by a wire-shaped SMA material or by a belt-shaped SMA material. The SMA actuator may provide a length change depending on its temperature. For example, an SMA actuator can be configured to reversibly change its shape due to thermal activation between an extended state and a contracted state. The extended and contracted states may correspond with the closed and opened positions of the piston, respectively. The SMA actuator may provide such a shape change due to phase transformation between two or more solid-state phases. Typically, the transformation is between a low-temperature phase/martensitic phase to a high-temperature phase/austenitic phase. Typically, the phase transformation is reversible and independent of time. According to various examples, the SMA actuator can employ the so-called extrinsic two-way effect. Here, the SMA actuator can be continuously held under a mechanical bias, e.g., provided by a resilient member. For example, heating the SMA actuator typically results in contraction and, thereby, displacement of the plunger. The contraction is typically related to the phase transformation, e.g., from de-twinned martensitic to austenitic in some SMA materials. A pseudo-plastic deformation may result where the extension of the SMA material is from austenitic to de-twinned martensitic directly, i.e., not via twinned martensitic.

It is possible to activate the SMA actuator by feeding a heating current to the SMA material. Due to the current flow, the SMA material is heated. The change in temperature causes the length change. In other examples, external heating elements arranged adjacent to the SMA actuator could be employed, e.g., separate current-carrying wires, etc.

In the various examples described herein, different materials may be used for the SMA actuator. Examples include a Nickel-Titanium (NiTi) alloy—e.g., binary NiTi alloys— such as the one sold under the tradename 90° FLEXINOL of DYNALLOY, Inc., Irvine, Calif. For example, ternary or quaternary elements may be added to such a NiTi-based SMA actuator, for example including carbon, oxide, copper, chromium, etc. Other examples for SMA actuators include copper-based alloys such as CuZnAl or CuAlNi.

According to some examples, a normally-closed valve is provided. Hence, activation of the SMA actuator—due to contraction—exerts a respective actuation force on the plunger to unseal a fluid port and to displace the plunger from its closed position to its opened position. It is possible that the displacement of the plunger, i.e., the contraction of the SMA actuator, is not limited by a stop etc. if the normally-closed valve is used. In particular, the displacement of the plunger may not be limited by the plunger coming into contact with a sealing surface of a fluid port upon contract of the SMA actuator. This may help to avoid an excessive load on the SMA actuator.

The techniques described herein enable the implementation of a linear geometry of the SMA actuator with respect to the displacement direction of the plunger. As such, a coaxial linear motion of the plunger and the longitudinal axis of the SMA actuator can be implemented. For example, the SMA actuator can extend along the displacement direction for at least 50% of its length, optionally for at least 80% of its length, further optionally of at least 90% of its length, further optionally of at least 95% of its length, further optionally of at least 99% of its length, further optionally of 100% of its length. Such a linear geometry enables to highly integrate the valve using compact dimensions for the housing. In particular, bulky lever-type arrangements are avoided. Furthermore, if compared to lever-type arrangements or generally a rotational sealing, a particular tight sealing of a fluid port may be achieved. This may be due to a sealing surface of the plunger engaging tightly and uniformly with a fluid port.

I) Valve Design

FIG. 1 illustrates aspects with respect to a valve 100 employing a SMA wire 151 to actuate a plunger 125. The valve 100, according to the example of FIG. 1, can implement a 2/2 valve functionality. FIG. 1 illustrates a one-way valve; here, a single plunger 125 is actuated. In FIG. 1, the closed position 91 of the plunger 125 is illustrated in which the plunger 125 seals a fluid port 121.

FIG. 1 illustrates a linear geometry. Here, the SMA wire 151 extends along a longitudinal axis 111A of the housing 111 for 100% of its length 251, albeit generally it would also be possible that the SMA wire 151 only extends along the axis 111 for a smaller fraction of its length 251. The housing 111 includes two long side surfaces 1111, 1112 and two short side surfaces 1113, 1114. The sealable fluid port 121 is arranged in the short side surface 1113. Likewise, the other fluid port 122 is arranged in the opposing short side surface 1114, albeit it could also be arranged in one of the long side surfaces 1111, 1112. In between the fluid ports 121, 122, there is defined a fluid flow path 116. As is apparent from FIG. 1, the linear shape of the housing 111 correlates with the linear arrangement of the SMA wire 151.

The SMA wire 151 has two ends 351, 352. The end 351 is coupled with the plunger 125. The end 352 is at a fixed position with respect to the reference frame of the housing 111. For this, a connection piece such as a crimp connection or adhesive connection may be employed. Thus, a length change of the SMA wire 151 results in a displacement of the plunger 125 away from a fluid port 121 (not shown in FIG. 1).

In the example of FIG. 1, the SMA wire 151 extends along its entire length 251 between the fluid ports 121, 122 defining the fluid flow path 116. In other words, the SMA wire 151 extends between the opposing sides 1113, 1114 of the housing 111 in which the fluid ports 121, 122 are arranged. Generally speaking, the SMA wire 151 may extend along at least 20%, optionally at least 50%, further optionally at least 90% of its entire length 251 between the fluid ports 121, 122. This facilitates a compact design of the valve 100—in particular if compared to scenarios where the SMA wire 151 extends away from the fluid flow path 116. Also, a tight engagement between a sealing surface of the plunger 125 and, e.g., an O-ring of the fluid port 121 can be facilitated.

Figure 2:
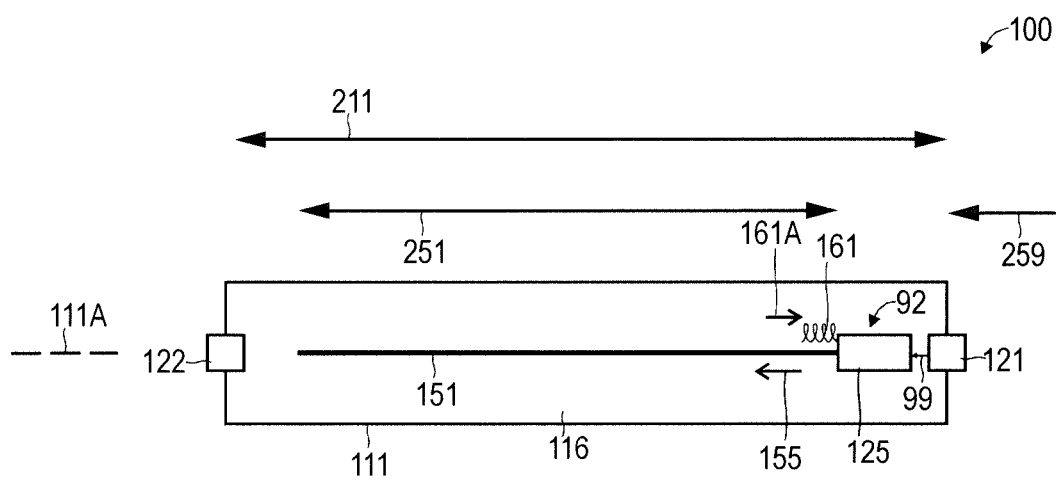

FIG. 2 illustrates aspects with respect to the valve 100 according to the example of FIG. 1. However, in FIG. 2, the opened position 92 of the plunger 125 is illustrated in which the plunger 125 does not seal the fluid port 121. Thus, a fluid may enter or exit the inner part of the housing 111 via the fluid port 121.

In FIG. 2, a displacement direction 259 of the plunger 125 is illustrated. When the SMA wire 151 contracts, it exerts an actuation force 155 on the plunger 125. The SMA wire 151 pulls the plunger 125 along the displacement direction 259 (horizontally, towards the left in FIG. 2). This actuation force 155 causes the plunger 125 to move/displace along the displacement direction 259. The respective displacement 99 of the plunger 125 from the closed position 91 to the open position 92 is illustrated in FIG. 2. This displacement 99 is parallel to the displacement direction 259. For example, to guide the displacement 99 along the displacement direction 259, guide slots, a dovetail guide, or other guide members may be provided (not shown in FIG. 2).

The SMA wire 151, in the example of FIG. 2, extends along the displacement direction 259 for 100% of its length—hence, a fully linear design is implemented; in other examples, the SMA wire 151 could extend along the displacement direction 259 for a smaller fraction of its length 251, e.g., for at least 50% of its length 251, optionally for at least 90% of its length, further optionally for at least 95% of its length.

Such a fully or partly linear geometry enables to implement the valve 100 with a small footprint. Also, the actuation force is efficiently transmitted from the SMA wire 151 to the plunger 125. Furthermore, complex lever-type geometry is not required and a tight sealing engagement between the plunger 125 and the fluid port 121 can be achieved.

In the various examples described herein, the connection piece between the SMA wire 151 and the plunger 125 does not provide a transmission ratio larger than 1:1±10—optionally 1:1±2%, further optionally 1:1±1%—where the transmission ratio is defined by the length change of the SMA wire 151 with respect to the displacement 99 of the plunger 125. For example, the transmission ratio can be 1:1; i.e., a length change of 2 mm of the SMA wire 151 results in a displacement of 2 mm of the plunger 125. This provides a simple and robust setup. The coupling can be a simple crimped connection, etc. Lever concepts using a pivotably arranged rod or the like which amplify the SMA contraction are not required.

Typically, the absolute length change of the SMA wire 151 is limited to some value in order to avoid non-elastic deformation and damage. The length change corresponds to strain. For example, typical strain may be limited to 3-7%. In order to nonetheless provide a sufficiently large displacement 99 of the plunger 125, the length 251 of the SMA wire 151 can be dimensioned sufficiently large. Then, even a small strain results in a significant displacement 99. Example implementations provide a length 251 of the SMA wire 151 in the range of 10 millimeters—50 millimeters, optionally in the range of 25 millimeters—35 millimeters. For example, here, a 2% length change of the SMA wire 151 results in a displacement of approximately 0.6 millimeters.

As illustrated in FIG. 2, the valve 100 further includes a resilient member 161. Example implementations of the resilient member 161 include a leaf spring and a coil spring or another elastic element such as a rubber element, etc. The resilient member 161 is configured to exert a bias force 161A onto the plunger 125. The bias force 161A generally urges the plunger 125 into the closed position 91, because in the example of FIGS. 1 and 2 a normally-closed valve 100 is provided. The bias force 161A generally opposes the actuation force 155 of the SMA wire 151. During displacement from the closed position 91 towards the opened position 92, the actuation force 155 is larger in magnitude than the bias force 161A. This causes the plunger 125 to move. In the opened position 92, the bias force 161A and the actuation force 155 may be in equilibrium. Alternatively or additionally, a stop member could be provided physically limiting further displacement of the plunger 125 beyond the opened position 92.

In the example of FIG. 2, the resilient member 161 is arranged on the same side of the plunger 125 as the SMA wire 151. Here, the bias force 161A may result from a compression of the resilient member 161. In other examples, it would also be possible that the resilient member 161 is arranged in between the plunger 125 and the fluid port 121, i.e., on the opposing side of the plunger 125 if compared to the SMA wire 151. Then, the bias force 161A may result from an extension of the resilient member 161.

The valve 100 according to the example of FIGS. 1 and 2 can be modified in other examples. For example, it would be possible to use more than a single SMA wire 151.

Figure 3A:
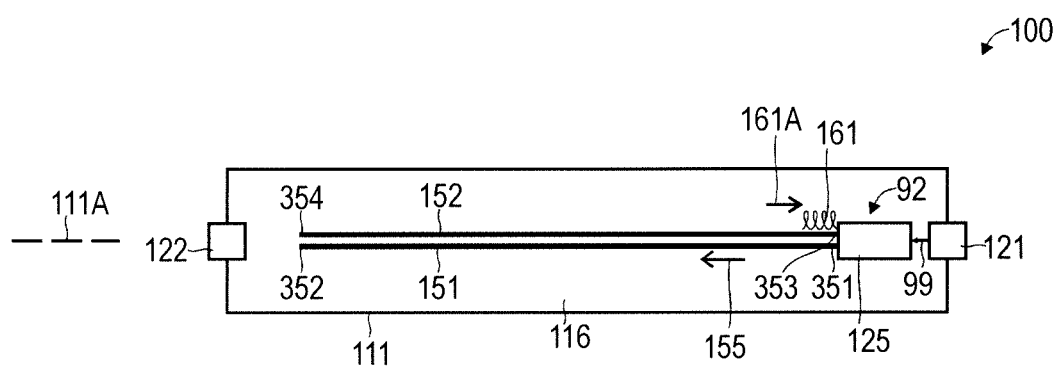
FIG. 3A schematically illustrates a valve including two parallel SMA wires to actuate a plunger according to various examples.

FIG. 3A illustrates aspects with respect to a valve 100 employing two SMA wires 151, 152 to actuate the plunger 125. Aside from the use of multiple SMA wires 151, 152, the valve 100 according to the example of FIG. 3A generally corresponds to the valve 100 according to the example of FIGS. 1 and 2.

The end 351 of the SMA wire 151 is coupled with the plunger 125. The end 353 of the SMA wire 152 is likewise coupled with the plunger 125. The end 352 of the SMA wire 151 is fixed with respect to the reference frame of the housing 111. Likewise, the end 354 of the SMA wire 152 is fixed with respect to the reference frame of the housing 111.

In other examples, it would be possible to use an even larger number of SMA wires in order to actuate the plunger 125. For example, a count of 3 or 4 or 5 SMA wires could be used. Generally, the various SMA wires can be arranged in parallel with respect to each other. The use of multiple SMA wires enables to increase the actuation force 155 provided by the multiple SMA wires; while avoiding overload with respect to each individual SMA wire. The stress per SMA wire can be reduced. It would also be possible to increase the total force provided by the multiple SMA wires, while the stress on each individual SMA wire remains constant. Such various design options can also be combined.

Figure 3B:
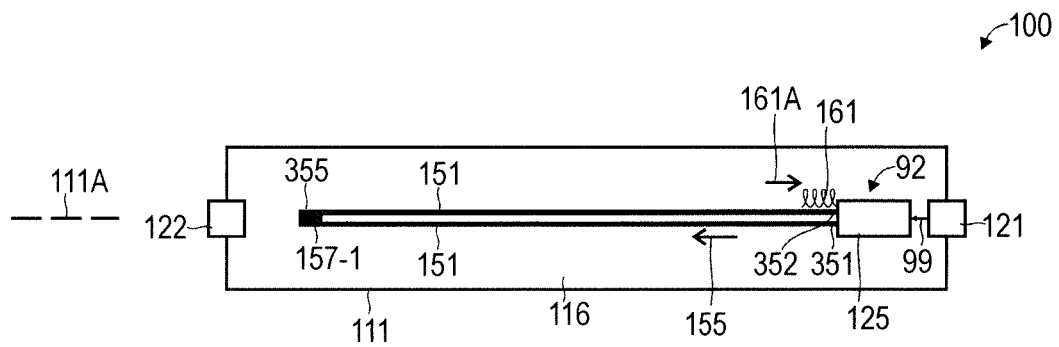
FIG. 3B schematically illustrates a valve including a single SMA wire arranged in a U-shape to actuate a plunger according to various examples.

FIG. 3B illustrates aspects with respect to a valve 100 employing a single SMA wire 151. In the example of FIG. 3B, the SMA wire 151 is arranged in a U-shape. In other words, the SMA wire 151 includes two sections which are arranged anti-parallel with respect to each other (upper and lower part of the SMA wire 151 in FIG. 3B).

Both ends 351, 352 of the SMA wire 151 are coupled to the plunger 125. In a middle region 355 of the SMA wire 151—arranged in between the end 351, 352—the SMA wire 151 is wound about a fixture 157-1 fixedly arranged with respect to the reference frame of the housing 111. The example scenario illustrated in FIG. 3B allows to provide a significant actuation force 155 and/or a significant displacement 99 due to the U-shaped arrangement of the SMA wire 151; at the same time, the number of electrical contacts to feed the heating current into the SMA wire 151 is limited (in particular if compared to the scenario of FIG. 3A using multiple distinct SMA wires). This simplifies the arrangement.

Figure 3C:
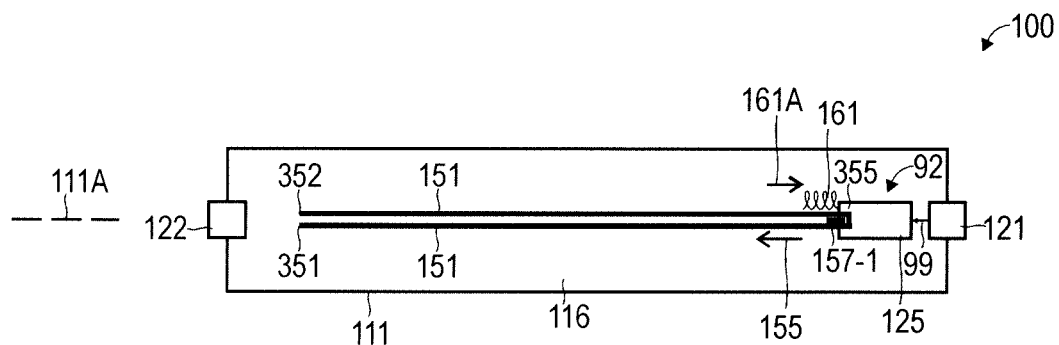
FIG. 3C schematically illustrates a valve including a single SMA wire arranged in a U-shape according to various examples.

FIG. 3C illustrates aspects with respect to a valve 100 employing a single SMA wire 151. The example of FIG. 3C generally corresponds to the example of FIG. 3B, but employs a somewhat inverted geometry. Here, the fixture 157-1 is coupled with the plunger 125 and the ends 351, 352 of the U-shaped SMA wire 151 are fixed in the reference frame of the housing 111. For example, the fixture 157-1 may be built into the plunger 125 and may, optionally, be formed integrally with the plunger 125.

Figure 3D:
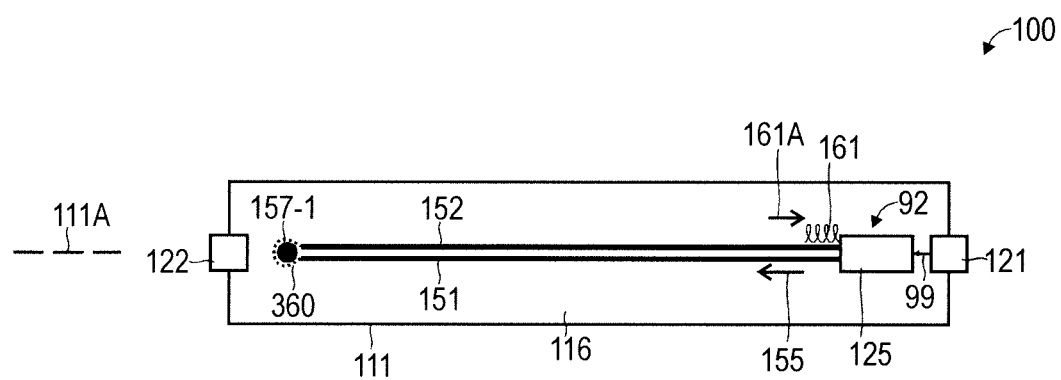
FIG. 3D schematically illustrates a valve including two parallel SMA wires coupled via an elastic segment according to various examples.

FIG. 3D illustrates aspects with respect to a valve 100 employing two SMA wires 151, 152 to actuate the plunger 125. The example of FIG. 3D generally corresponds to the example of FIG. 3A. However, the two SMA wires 151, 152 are connected by a segment 360 at the respective ends opposing the plunger 125. For example, the segment 360 could be implemented by a belt of an elastic material. The segment 360 may be or may not be electrically conductive. The segment 360 is wound about a fixture 157-1 fixed in the reference frame of the housing 111.

The segment 360 may be elastic. In particular, in may be possible that the segment 360 has an elasticity which is larger than the elasticity of the SMA wires 151, 152. Thereby, additional tolerances can be provided when assembling the valve 100. In particular, offsets in the length 251 of the SMA wires 151, 152 may be compensated by the segment 360 which can extend or contract accordingly. Here, it is not required that the segment 360 includes the SMA material. The material of the segment 360 may be generally different from the material of the SMA wires 151, 152. E.g., a polymer or plastic material may be used.

A further effect of the segment 360 can be to load the SMA wires 151, 152 appropriately. For example, the segment 360 could be crimped to the SMA wires 151, 152 after being pulled to the correct tension such that the SMA wires 151, 152 are loaded appropriately.

Figure 4:
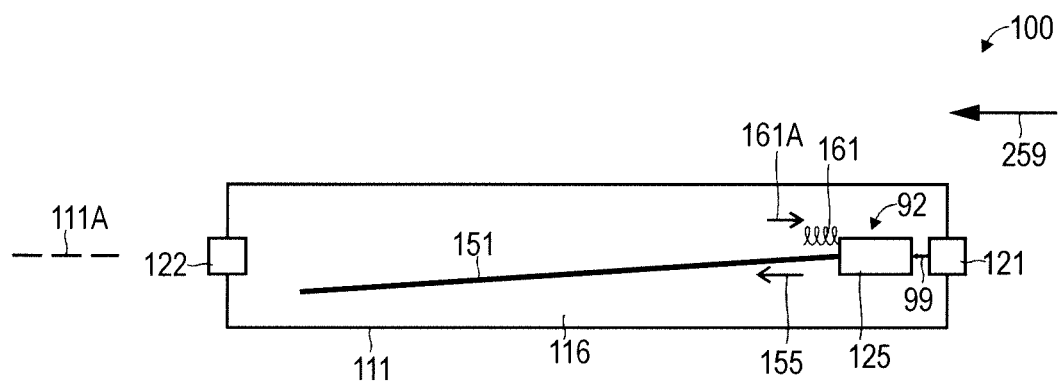
FIG. 4 schematically illustrates a valve including a SMA wire enclosing an angle with the displacement direction of the plunger according to various examples.

FIG. 4 illustrates aspects with respect to the valve 100 employing a single SMA wire 151. However, examples discussed with respect to FIG. 4 could also be applied for valves including multiple SMA wires. In the example of FIG. 4, the SMA wire 151 encloses an angle with respect to the displacement direction 259. For example, the angle enclosed by the SMA wire 151 and the displacement direction 259 could be less than 20°, optionally less than 5°, further optionally less than 1°.

In the example of FIG. 4 (as well as in some of the further FIGS.), the longitudinal axis 111A of the housing 111 is aligned with the displacement direction 259 of the plunger 125; hence, the SMA wire 151 encloses the respective angle also with the longitudinal axis 111A. Here, the transmission ratio between the length change of the SMA wire 151 and the displacement 99 of the plunger 125 of less than 1:1. For example, a length change of the SMA wire 151 amounting to 2 millimeters can result in a displacement 99 of the plunger 125 of less than 2 millimeters. This is because the projection of the axis of the SMA wire 151 onto the displacement direction 259 defines the displacement 99.

Figure 5:
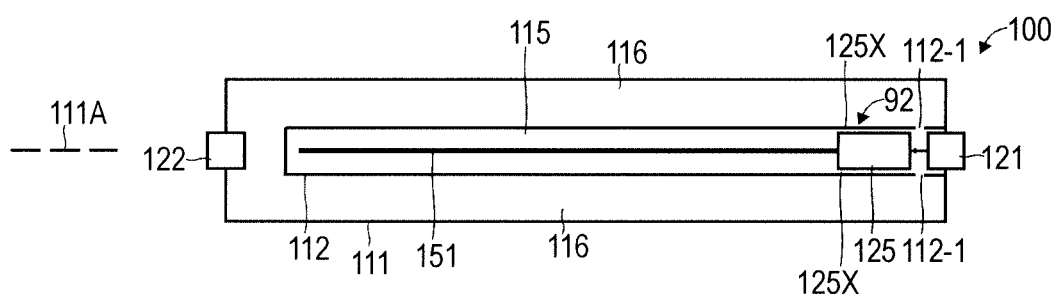
FIG. 5 schematically illustrates a valve including a SMA wire arranged in an inner compartment of a housing of the valve, the inner compartment being defined by a screen extending along the SMA wire according to various examples.

FIG. 5 illustrates aspects with respect to the valve 100 employing a single SMA wire 151. In the example of FIG. 5, the valve 100 includes a screen 112 which extends along the SMA wire 151. The screen 112 delimits the inner compartment 115 of the housing 111 in which the SMA wire 151 is arranged from the fluid flow path 116. The fluid flow path 116 is defined by openings 112-1 in the screen 112 that are arranged adjacent to the fluid port 121. In particular, the openings 112-1 are arranged in between the plunger 125 and the fluid port 121 if the plunger 125 is in the opened position 92. Then, the fluid passing through the fluid port 121 also passes through the openings 112-1. While in the example of FIG. 5 a count of two openings 112-1 to both sides of the fluid port 121 is illustrated, in other examples, it would also be possible that a larger count of openings is employed.

By using the screen 112, it is possible to reduce the wearout of the SMA wire 151. In particular, friction between the flowing fluid and the SMA wire 151 can be reduced, because the fluid can be guided offset and away from the SMA wire 151. Furthermore, by using the screen 112, it may also possible to avoid localized temperature changes in the surrounding of the SMA wire 151. For example, a cold fluid flow in the direct vicinity of the SMA wire 151 may be avoided; this can increase the durability of the SMA wire 151. Also, any hot airflow, e.g., from a pumpline, could adversely affect the transition temperature for actuating the SMA wire 151; this is avoided by use of the screen 112. To achieve such effects, it is generally not required that the inner compartment 115 is completely sealed off from the fluid flow path 116. Hence, it is generally possible that the inner compartment 115 is fluidly coupled with the fluid flow path 116 (illustrated in FIG. 5 by the offset 125X of the plunger 125 from the screen 112). This simplifies the inner design and reduces the required footprint.

Figure 6:
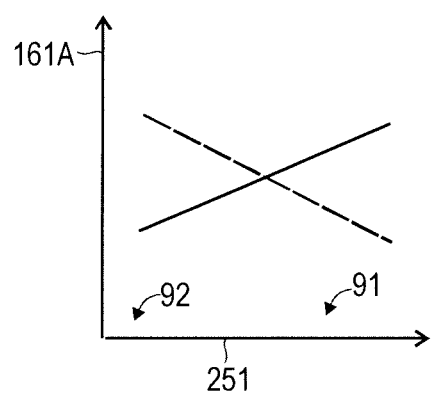

FIG. 6 illustrates aspects with respect to the force profile of the resilient member 161. In particular, FIG. 6 illustrates the bias force 161A exerted by the resilient member 161 on the plunger 125—and, via the plunger 125, on the SMA wire 151, 152—as a function of the length 251 of the SMA wire 151, 152. As illustrated with respect to the various examples described herein, typically, the length 251 of the SMA wire 151, 152 directly translates into the displacement 99 of the plunger 125. As such, in FIG. 6, also the closed position 91 and the opened position 92 are illustrated (for example, the opened position 92 corresponds to the contracted state of the SMA wire 151 having a comparably short length 251).

In FIG. 6, a forward force bias (dashed line) and a reverse force bias (full line) are illustrated. Here, the forward force bias corresponds to the following scenario: as the length 251 of the SMA wire 151, 152 decreases, the bias force 161A of the resilient member 161 increases. For example, if a conventional coil spring is used as the resilient member 161, this dependency corresponds to Hook's law where larger deviations from the rest position of the coil spring—due to elongation or compression—result in larger bias forces 161A.

According to various examples, it would also be possible that the resilient member 161 is configured to provide a reversed force profile. Here, the bias force 161A is larger (smaller) for larger (smaller) lengths of the SMA wire 151, 152. Here, the respective linear dependency of FIG. 6 is an illustrative example only. More complex dependencies also including a change of sign of the derivative of the bias force 151A as a function of the length 251 could be implemented. The reversed force profile may result in reduced wearout of the SMA wire 151, 152.

Generally, various different techniques are conceivable in order to implement the reversed force profile. In one example, the reversed force profile may be provided by an appropriately shaped leaf spring implementing the resilient member 161.

Figure 7:
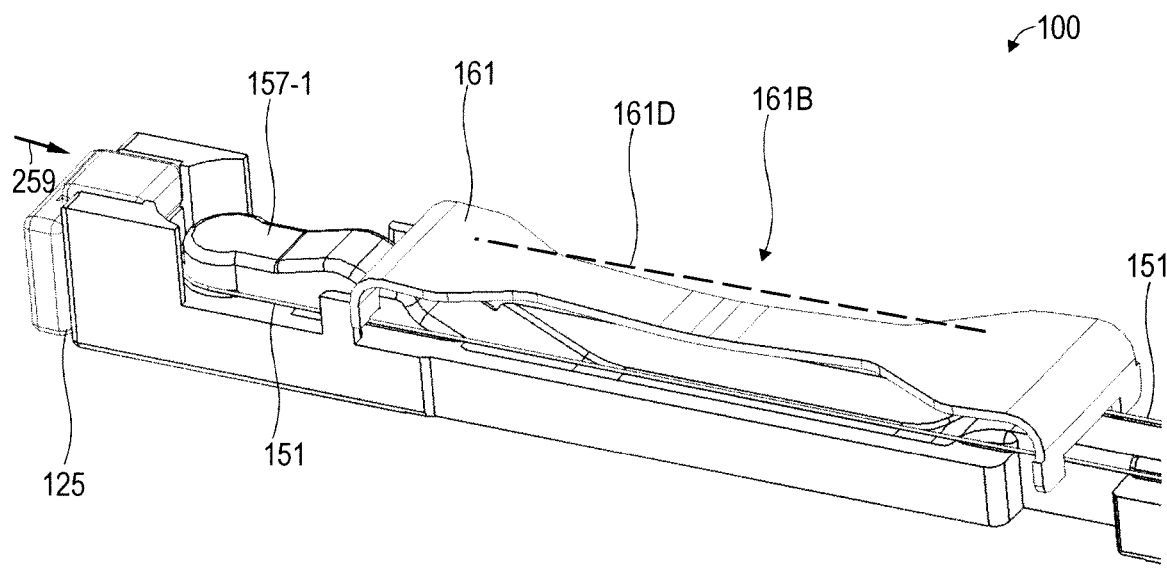

FIG. 7 illustrates aspects with respect to the resilient member 161. FIG. 7 is a perspective view of an example valve 100 (in FIG. 7, the housing 111 is not illustrated). In FIG. 7, the sealing surface of the plunger 125 is arranged on the left-hand side. The SMA wire 151 is U-shaped. A fixture 157-1 is arranged adjacent to the sealing surface of the plunger 125 (cf. FIG. 3C).

In the example of FIG. 7, the resilient member 161 is implemented by a leaf spring 161. Sometimes, the leaf spring may be referred to as semi-elliptical spring. A longitudinal axis 10 of the leaf spring 161 is aligned with the SMA wire 151 and the displacement direction 259. When the plunger 125 displaces from its closed position (in FIG. 7 to the left) towards its opened position (in FIG. 7 to the right), the leaf spring 161 is compressed. Here, the larger the compression, the smaller the bias force; thereby, defining the reversed force profile. By means of the leaf spring 161, it is possible to provide a reversed force profile at a comparably small package, i.e., using comparable small dimensions of the housing 111. For example, outer dimensions of the housing 111 may be less than 15 mm for the short sides 1113, 1114, optionally less than 10 mm, further optionally less than 7 mm. The outer dimensions of the housing 111 may be less than 150 mm for the long sides 1111, 1112, optionally less than 100 mm, further optionally less than 70 mm.

Compression of the leaf spring 161 results in a deflection of the leaf spring 161. In order to facilitate the deflection of the leaf spring 161, the leaf spring 161 may be made out of a material having a sufficient elasticity, i.e., providing material-induced elasticity. Further, as illustrated in the example of FIG. 7, the leaf spring 161 includes a tapered middle portion 161B. The tapered middle portion 161B may provide shape-induced elasticity. Alternatively or additionally, the tapered middle portion 161B may be designed to reduce the spring force of the leaf spring 161. The tapered middle portion 161B is optional. In other examples, the leaf spring 161 may be designed without the tapered middle portion 161B.

Figure 8:
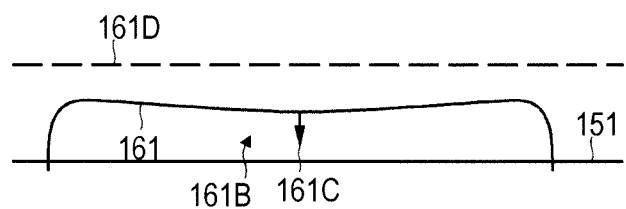
FIG. 8 is a schematic side view of the leaf spring according to the example of FIG. 7, wherein the leaf spring comprises a middle section defining deflection of the lead spring upon compression.

FIG. 8 illustrates aspects with respect to the resilient member 161. FIG. 8 is a side view of the resilient member 161 implemented by the leaf spring according to the example of FIG. 7. In FIG. 8, the deflection 161C of the leaf spring 161 towards the SMA wire 151 is depicted. Such an arrangement allows integrating the leaf spring 161 into a small footprint of the housing 111.

In an alternative scenario, it would also be possible that the deflection 161C of the leaf spring 161 is oriented away from the SM wire 151.

Figure 8A:
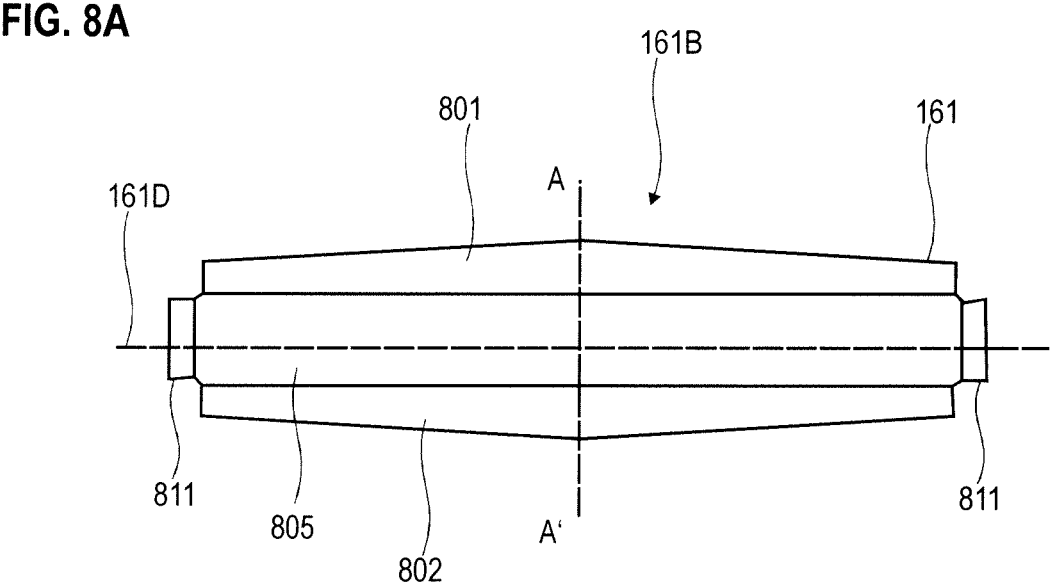
FIG. 8A is a side view of a resilient member implemented by a leaf spring according to various examples.

FIG. 8A illustrates aspects with respect to the resilient member 161. In the example of FIG. 8A, the resilient member 161 is implemented as a leaf spring. As such, the scenario of FIG. 8A generally corresponds to the scenario of FIG. 7. This helps to achieve a reversed force profile for the SMA wire 151, 152. It has been found that the particular shape of the leaf spring 161 according to the scenario of FIG. 8A helps to provide the reversed force profile for the SMA wire 151, 152; as well as provides for limited wearout of the leaf spring 161 such that many activation cycles can be endured before damage to the material of the leaf spring 161.

In the scenario FIG. 8A, the leaf spring 161 again extends along a longitudinal axis 161D. This axis can be aligned with the displacement direction 259 as explained, e.g., in connection with FIG. 7. This helps to reduce the footprint required.

The leaf spring 161 has a middle portion 161B arranged in between the two end parts 811. The middle portion 161B is widened. Hence, a width of the leaf spring 161 increases towards the middle part 161B, as seen from one of the end parts 811.

Figure 8B:
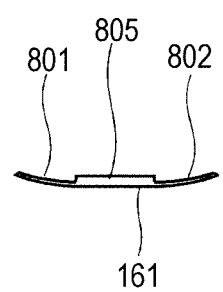
FIG. 8B is a cross-sectional view of the leaf spring of FIG. 8A.

FIG. 8B is a cross-sectional view of the leaf spring 161 of the scenario FIG. 8A, taken along the line A-A' of FIG. 8A. Here, it is apparent that the leaf spring includes a center part 805 and edge parts 801, 802 forming wings. Specifically, these wings 801, 802 are deflected/tilted if compared to the center part 805. The wings 801, 802 are curved away from the plane of the center part 805. The wings 801, 802 extend from the center part 805 which may or may not be of larger thickness (up-down direction of FIG. 8B) if compared to the wings 801, 802.

As a general rule, the wings 801, 802 may be bent upwards or downwards if compared to the center part 805.

When the leaf spring 161 is compressed/bent, then there may be a force acting to move the wings 801, 802 into the plane of the center part 805. Hence, there may be a tendency to flatten the wings 801, 802 upon compression of the leaf spring 161. This helps to provide the reverse force bias.

This configuration including the wings 801, 802 was found to provide a reversed force profile which is helpful to reduce wearout of the SMA wire 151, 152 (not illustrated in FIGS. 8A and 8B).

As a general rule, while FIG. 8B illustrates a scenario in which the leaf spring 161 has the widened middle portion 161B, in other scenarios it would be possible to provide the wings 801, 802 for a tapered middle portion 161B (cf. FIG. 7) or for a leaf spring without width variation along its longitudinal axis 161D.

As a further general rule, instead of relying on a pair of wings 801, 802, it would be possible to include a single wing on either side of the center part 805. Hence, the leaf spring 161 may include one or more wings 801, 802.

Figure 8C:
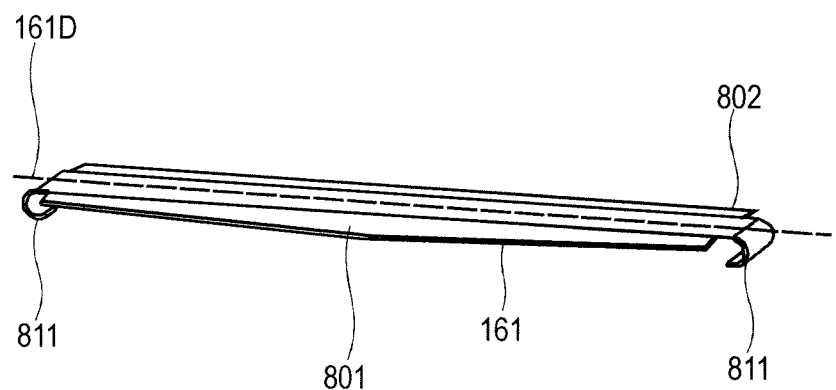
FIG. 8C is a perspective view of the lead spring of FIG. 8A.

FIG. 8C is a perspective view of the leaf spring 161 of FIG. 8A in FIG. 8B. FIG. 8C illustrates the end parts 811 that can be used to fix the leaf spring 161 at the plunger and the housing.

Figure 9A:
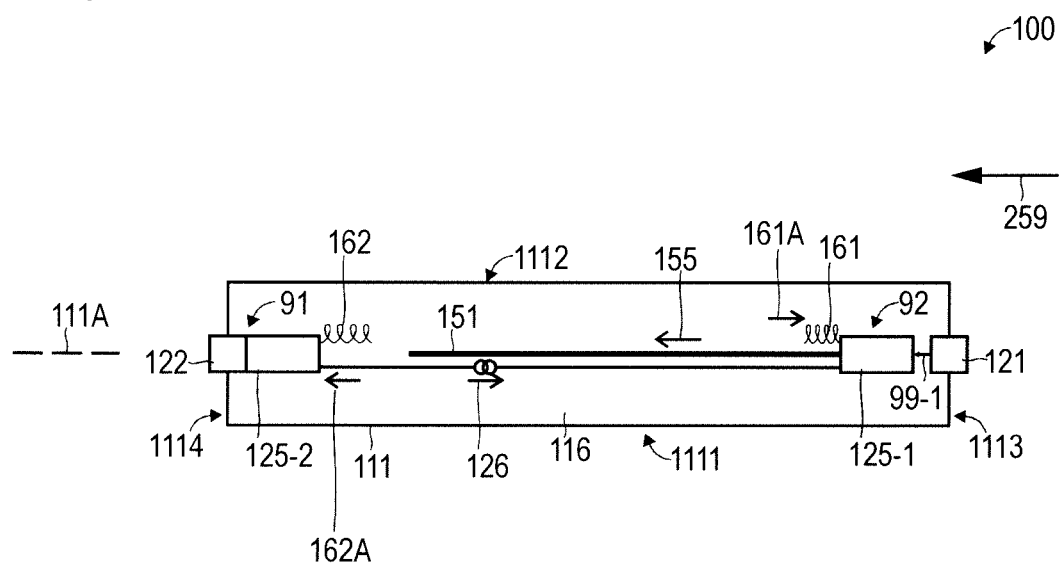
FIG. 9A schematically illustrates a two-way valve including a SMA wire according to various examples, wherein in FIG. 9A a first plunger of the valve is in its opened position and a second plunger of the valve is in its closed position.

FIG. 9A illustrates aspects with respect to a valve 100. The valve 100 according to the example of FIG. 9A includes two plungers 125-1, 125-2. The plunger 125-1 selectively seals the fluid port 121; while the plunger 125-2 selectively seals the fluid port 122. Thereby, the valve 100 of FIG. 9A implements a two-way valve functionality. Here, the plunger 125-1 is actuated by the SMA wire 151 in a manner comparable to the other examples described herein.

For example, the valve 100 according to the example of FIG. 9A may provide a 3/2 valve functionality. For this, an additional fluid port may be provided (not shown in FIG. 9A for sake of simplicity). For example, the additional fluid port may be arranged on one of the long side surfaces 1111, 1112 or on one of the short side surfaces 1113, 1114. The fluid can be exhausted via the additional fluid port.

Additionally, a coupling 126 is provided between the plunger 125-1 and the plunger 125-2. Thereby, the displacement 99-1 of the plunger 125-1 correlates with the corresponding displacement of the plunger 125-2. According to the example of FIG. 9A, the plunger 125-1 is in its opened position 92 while the plunger 125-2 is in its closed position 91.

For example, the displacement 99-1 of the plunger 125-1 may translate one-to-one into the displacement of the plunger 125-2. In would also be possible that the displacement 99-1 of the plunger 125-1 does not translate one-to-one into the displacement of the plunger 125-2. For example, it would be possible that one of the plungers 125-1, 125-2 reaches a stop—e.g., when coming into contact with the respective fluid port—and the other one of the plungers 125-1, 125-2 then continues to displace.

Figure 9B:
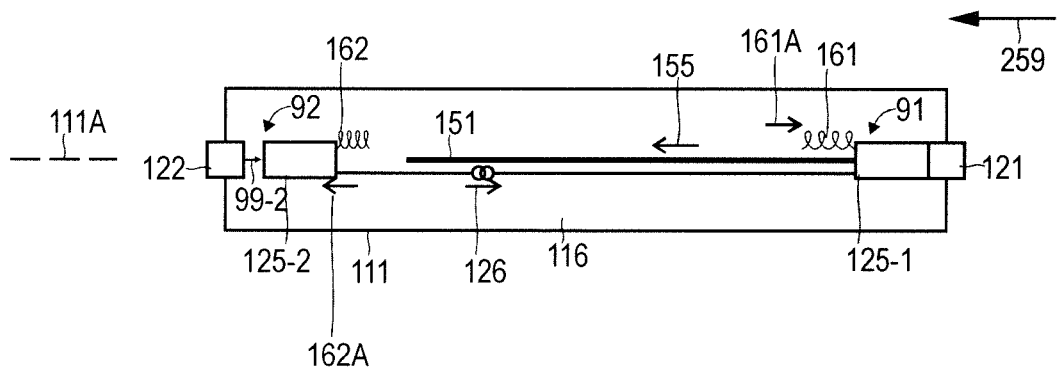
FIG. 9B schematically illustrates the two-way valve of FIG. 9A, wherein in FIG. 9B the first plunger is in its closed position and the second plunger is in its opened position.

FIG. 9B illustrates aspects with respect to the valve 100 according to the example of FIG. 9A. However, in the example of FIG. 9B, the plunger 125-1 is in the closed position 91 while the plunger 125-2 is in the opened position 92. From a comparison of FIGS. 9A and 9B, the alternating configuration of the plungers 125-1, 125-2 is apparent. Such an alternating configuration of the plungers 125-1, 125-2 with respect to the corresponding closed and opened positions is achieved by the coupling 126.

Next, details of the functioning of the coupling 126 are explained. The coupling 126 is configured to at least partially translate the displacement 99-1 of the plunger 125-1 into the displacement 99-2 of the plunger 125-2. The displacement 99-2 is also oriented along the displacement direction 259, but is opposing the displacement 99-1. In some examples, the coupling 126 may be a two-way coupling; i.e., the coupling 126 may be configured to rigidly couple the plungers 125-1, 125-2 and fully transfer any displacement 99-1, 99-2 there between. However, in the example of FIG. 9B, a one-way coupling 126 is employed (illustrated by the arrow adjacent to the coupling 126 in FIG. 9B). Here, only a force directed to urge the plunger 125-1 into its closed position 91—e.g., the bias force 161A—is transferred by the coupling 126 to the plunger 125-2. Differently, any force directed to urge the plunger 125-1 into its opened position 92—e.g., the actuation force 155 of the SMA wire 151—is not transferred by the coupling 126 to the plunger 125-2. Such a one-way configuration of the coupling 126 avoids overload imposed on the SMA wire 151. In particular, it is avoided that the SMA wire 151 has to exert an actuation force 155 sufficiently large to actuate, both, the plunger 125-1 and the plunger 125-2.

To reliably actuate the plunger 125-2 between its closed position 91 and its opened position 92, a further resilient member 162 is provided. The resilient member 162 is associated with the plunger 125-2. The resilient member 161 may be implemented as a leaf spring; while the resilient member 162 may be implemented by a coil spring. The resilient member 162 is configured to exert the bias force 162A urging the plunger 125-2 into its closed position 91. In particular, it is possible that the bias force 162A is dimensioned smaller than the bias force 161A. Then, the following can be achieved: considering a scenario where the plunger 125-1 is in the opened position 92 and the plunger 125-2 is in the closed position 91 (cf. FIG. 9A). If the heating current to the SMA wire 151 is cut, the temperature in the SMA wire 151 decreases and the SMA wire 151 does not provide the actuation force 155 anymore. Then, the bias force 161A urges the plunger 125-1 towards its closed position 91. Because the bias force 161A is dimensioned larger than the bias force 162A, the bias force 161A is also sufficient to displace the plunger 125-2 to its opened position 92. After a while, the SMA wire 151 may be heated again to cause contraction. Then, the actuation force 155 acts on the plunger 125-1, but the resulting force—now oriented to urge the plunger into its opened position 92—is not transmitted towards the plunger 125-2 by the one-way coupling 126. However, the bias force 162A urges the plunger 125-2 towards its closed position 91 (cf. FIG. 9B).

Figure 10:
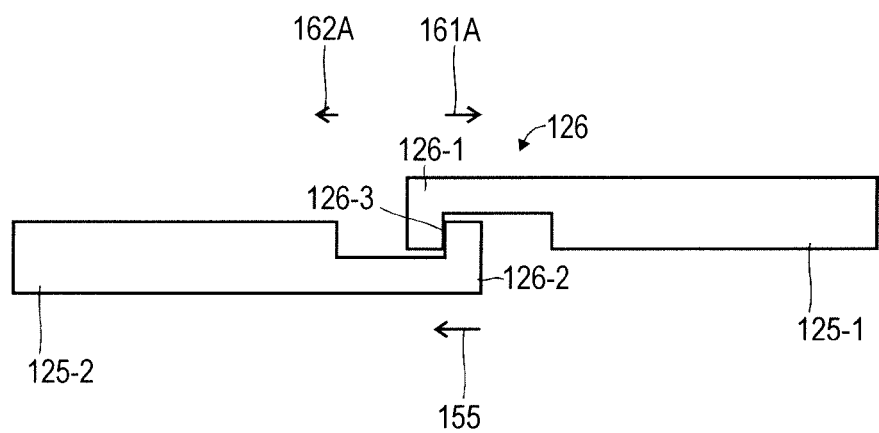
FIG. 10 schematically illustrates a one-way coupling between the first plunger and the second plunger of the two-way valve of FIG. 9A according to various examples.

FIG. 10 illustrates aspects with respect to the coupling 126. In particular, FIG. 10 illustrates an example implementation of the one-way coupling 126 according to the example of FIG. 9B. In the example of FIG. 10, the plunger 125-1 includes an extension 126-1 configured to engage with an interrelated extension 126-2 of the plunger 125-2. Respective engagement surfaces 126-3 face each other. Such a configuration is facilitated by the coaxial alignment of the displacement directions 99-1, 99-2 of the plungers 125-1, 125-2. This, in turn, is facilitated by the arrangement of the fluid ports 121, 122 on opposing short side surfaces of the housing 111.

If the actuation force 155 moves the plunger 125-1 towards its opened position (to the left in FIG. 10) the engagement surfaces 126-3 disengage. Then, the resilient member 162 exerts the bias force 162A so that the plunger 125-2 also displaces to the left. Differently, if the bias force 161A moves the plunger 125-1 towards its closed position (to the right in FIG. 10), the engagement surfaces 126-3 engage. Because the bias force 161A is dimensioned to be larger than the bias force 162A, the plunger 125-2 follows and also displaces to the right, i.e., towards its opened position 92.

Figure 11:
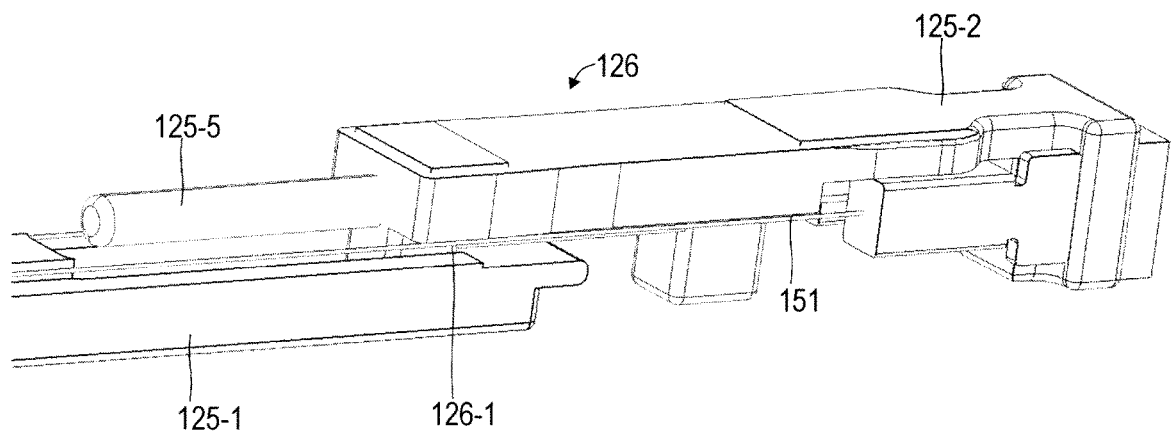
FIG. 11 is a perspective view of an example implementation of a one-way coupling between the first plunger and the second plunger of the two-way valve of FIG. 9A.

FIG. 11 illustrates aspects with respect to the coupling 126. In particular, FIG. 11 is a perspective view of the one-way coupling 126 according to the examples of FIGS. 9A, 9B, and FIG. 10.

In FIG. 11, an extension rod 125-5 of the plunger 125-2 is illustrated; here, a coil spring could be mounted to provide the bias force 162A.

Figure 11A:
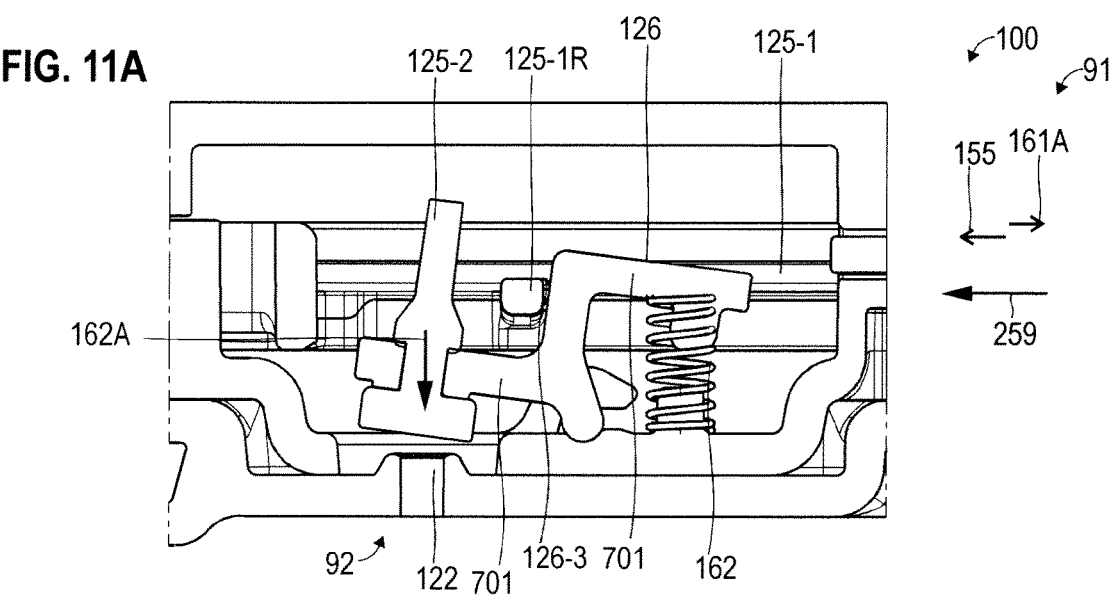
FIG. 11A schematically illustrates a one-way coupling between a first plunger and a second plunger according to various examples, wherein the first plunger is in its closed position in FIG. 11A.
Figure 11B:
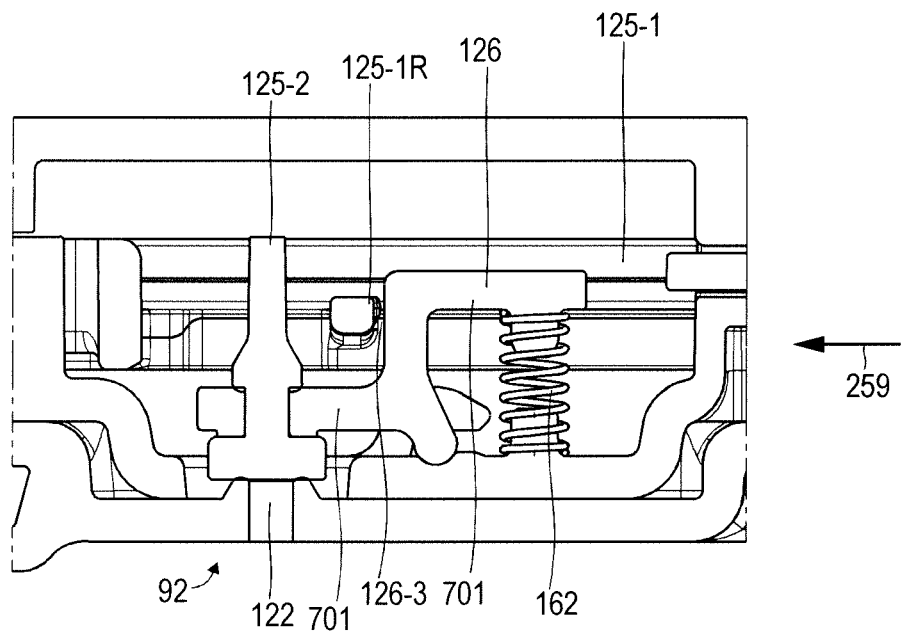
FIG. 11B schematically illustrates the one-way coupling of FIG. 11A, wherein the first plunger is in an intermediate position between the closed position and the opened position in FIG. 11B.
Figure 11C:
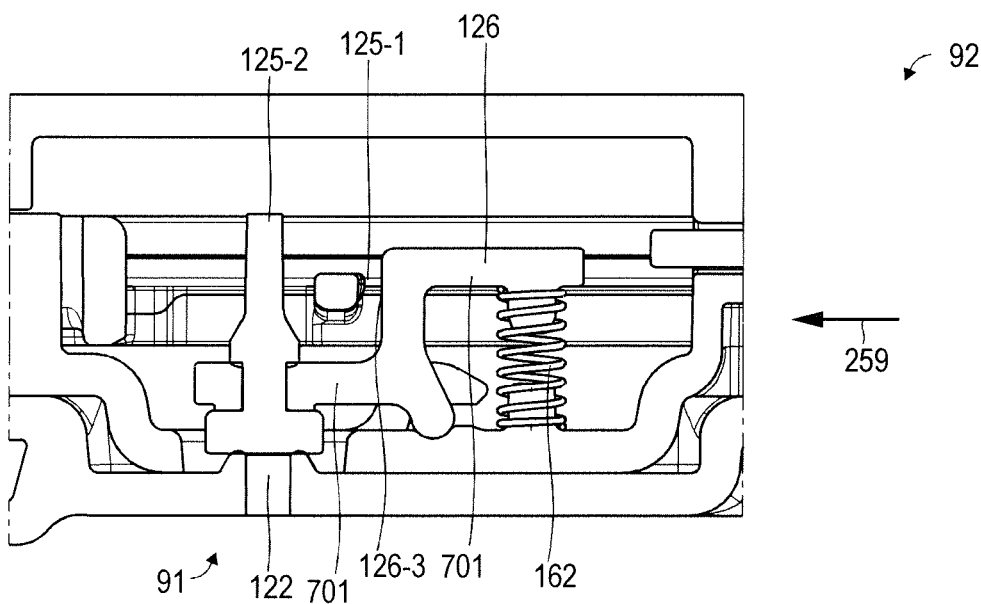
FIG. 11C schematically illustrates the one-way coupling of FIG. 11A, wherein the first plunger is in the closed position in FIG. 11C.

FIGS. 11A-11C illustrate aspects with respect to a valve 100. The valve 100 according to these examples includes two plungers 125-1, 125-2. Specifically, FIGS. 11A-11C illustrate an example implementation of the scenario according to FIGS. 9A, 9B, and 10. FIGS. 11A-11C illustrate aspects with respect to the coupling 126.

The plunger 125-1 (extending left-right in FIGS. 11A-11C) is configured to selectively seal the fluid port 121 (the fluid port 121 is not illustrated in FIGS. 11A-11C). The plunger 125-1 is activated by the SMA wire 151 in a manner comparable to other examples described herein. Upon actuation, the actuation force 155 displaces the plunger 125-1 along the displacement direction 259. The bias force 161A urges the plunger 125-1 in its closed position 91. FIG. 11A illustrates the closed position 91;

FIG. 11C illustrates the opened position 92; in FIG. 11B illustrates an intermediate position of the plunger 125-1.

In the scenario of FIGS. 11A-11C, the coupling 126 includes a lever 701. The lever 701 includes an engagement surface 126-3 that engages, in the closed position 91 of the plunger 125-1, with a protrusion 125-1R of the plunger 125-1. Instead of the protrusion 125-1R, other means of engagement of the plunger 125-1 with the lever 701 may be relied upon, e.g., indentations, etc.

A compression spring 162 is provided. The compression spring 162 is coupled with the plunger 125-2 via the coupling 126, i.e., via the lever 701. This helps to reduce the footprint required for the coupling 126, the compression spring 162, and the plunger 125-2.

Instead of a compression spring 162, other types of resilient members may be used, e.g., a leaf spring (not illustrated).

The compression spring 126 is configured to exert a bias force 162A on the plunger 125-2. The bias force 162A urges the plunger 125-2 into its closed position 92. The bias force 162A is also transferred, at least in parts, via the engagement surface 126-3 onto the plunger 125-1 when the plunger 125-1 is in the closed position 91; the transferred part of the bias force 162A opposes the bias force 161A.

The bias force 161A is larger than the bias force 162A. Therefore, the plunger 125-1 is not released from its closed position 91, unless the SMA wire 151 is actuated to contract. Further, the plunger 125-2 is not released from its opened position 92, unless the SMA wire 151 is actuated to contract.

The lever 701 is free to displace the plunger 125-2 once the plunger 125-1 is displaced along the displacement direction 259 by actuation of the SMA wire 151. This is illustrated in FIG.11B and in FIG.11C, where the protrusion 125-1R disengages with the lever 701. This is due to a stop provided to the lever 701. Thus, in the contracted state of the SMA wire 151—when the plunger 125-1 is in the opened position 92—, the bias force 162A is not transferred by the coupling 701 towards the plunger 125-1. This helps to reduce the force exerted on the SMA wire 151 and the contracted state; thereby a reduced wearout of the SMA wire 151 may be obtained. For example, a reversed force profile may be supported.

Due to the asymmetric engagement of the protrusion 125-1R and the engagement surface 126-3 of the lever 701 of the coupling 126, the bias force 161A is transmitted from the plunger 125-1 to the plunger 125-2; however, the actuation force 155 is not transmitted (cf. FIG. 10). This limits the load imposed on the SMA wire 151; thereby mitigating overstress in the SMA wire 151.

As illustrated in FIG. 11A-FIG.11C, the displacement direction 259 of the plunger 125-1 is rotated vis-à-vis the displacement direction of the plunger 125-2, by approximately 90°. Generally, the displacement direction of the plunger 125-2 may be rotated with respect to the displacement direction 259 of the plunger 125-1 by 90°±45°, optionally 90°±25°. The plunger 125-2 displaces including translational motion and rotational motion. This is due to the lever 701 of the coupling 126. Such an arrangement provides a reduced footprint of the coupling 126 and the plunger 125-2. This may be particularly helpful where a 3/2-valve functionality is implemented using such an arrangement of the coupling 126 including the lever 701.

Figure 12:
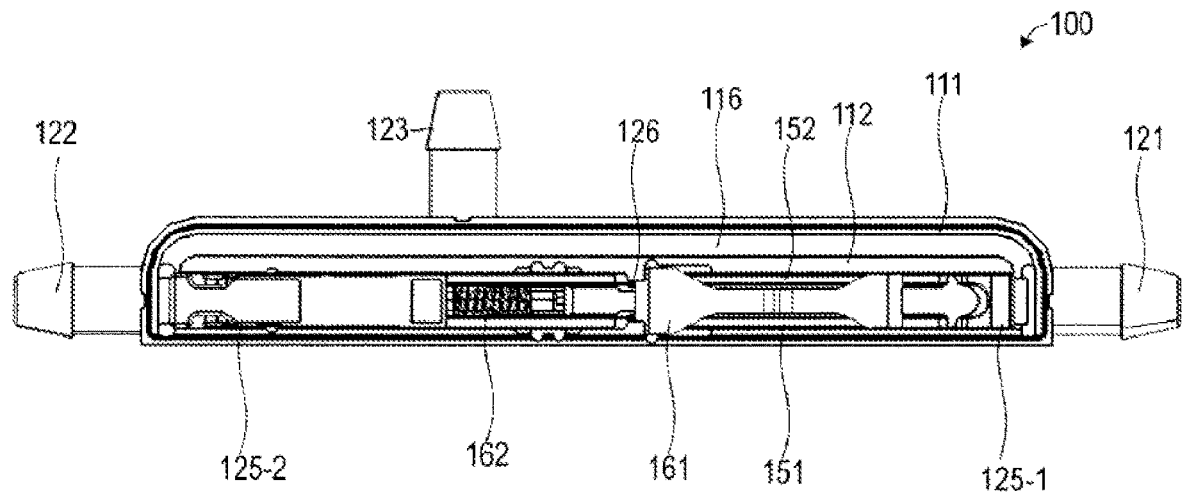
FIG. 12 is a side view of an example implementation of a two-way valve including a first plunger, a second plunger, a first resilient member associated with a first plunger, and a second resilient member associated with the second plunger according to various examples.

FIG. 12 illustrates aspects with respect to the valve 100. The valve 100, according to the example of FIG. 12, includes three fluid ports 121-123. For example, the valve 100 could implement a 3/2 valve functionality. The plungers 125-1, 125-2 are coupled via the coupling 126. The resilient member 161 is implemented as a leaf spring; while the resilient member 162 is implemented by a coil spring. In particular, because the bias force 162A does not act on the SMA wire 151 (due to the one-way coupling 126), here, no reverse force bias is required; hence, it is not required to use a leaf spring for the resilient member 162.

An example application of the 3/2 valve functionality may be with respect to a massage functionality of a vehicle seat using air bladders. Here, it would be possible that the exhaust port 123 is for the bladder/output, and the fluid port 122 is for deflate/exhaust of the air.

Figure 13:
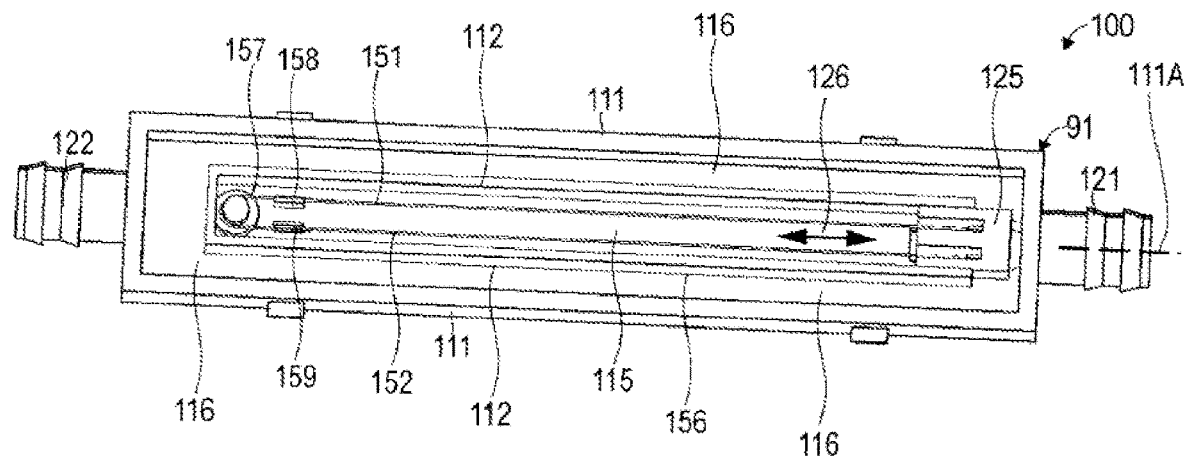
FIG. 13 is a perspective view of an example implementation of a valve including two SMA wires coupled with a plunger.

FIG. 13 illustrates aspects with respect to a valve 100. The valve 100 according to the example of FIG. 13 includes two SMA wires 151, 152 running in parallel and arranged within an inner compartment 115 formed within the housing 111 by the screen 112.

Figure 14:
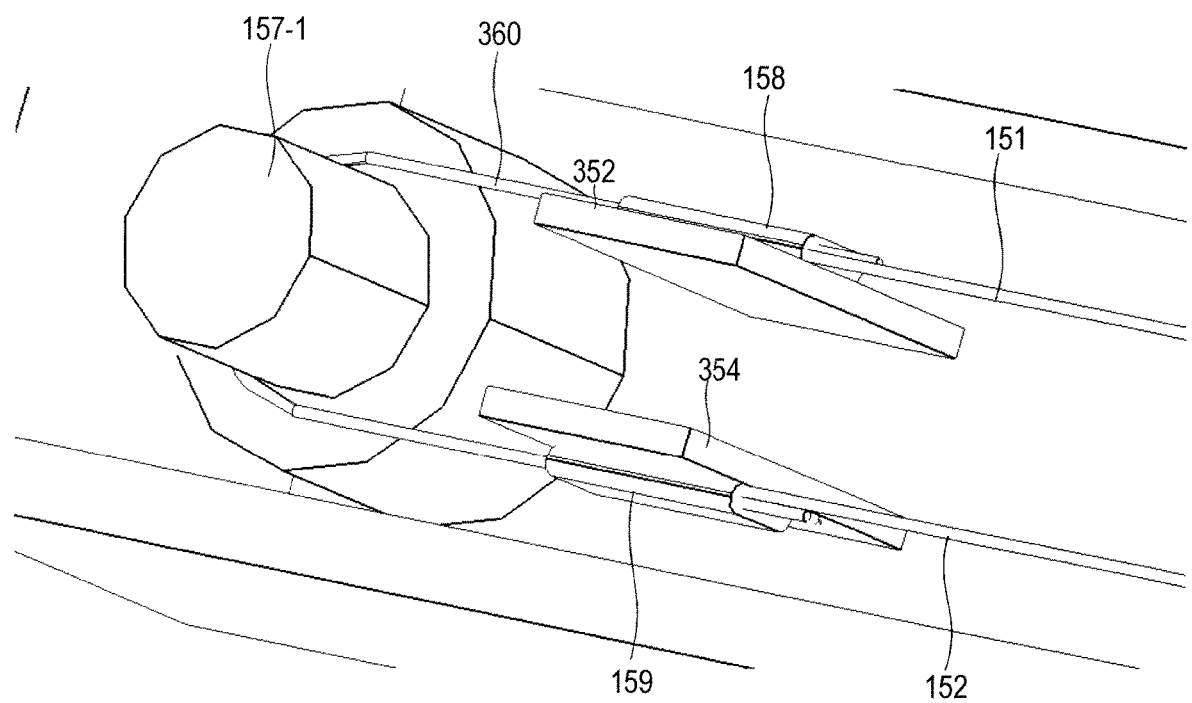
FIG. 14 illustrates details with respect to electrical connections of the two SMA wires of the valve of FIG. 13 according to various examples.

FIG. 14 is a detailed view of the valve 100 of the example of FIG. 13. In particular, FIG. 14 illustrates the ends 352, 354 of the SMA wires 151, 152 arranged remote from the plunger 125. The ends 352, 354 are implemented by a crimped connection of the SMA wires 151, 152 to a segment 360 wound about a fixture 157-1. Here, the segment 360 is non-conductive such that a heating current cannot flow via the segment 360. The segment 360 may have a large elasticity to provide additional tolerances; in particular the elasticity of the segment 360 may be larger than the elasticity of the SMA wires 151, 152. In other examples, it would also be possible that the elasticity of the segment 360 is about the same as the elasticity of the SM wires 151, 152 or even less.

The crimped connection of the SMA wires 151, 152 also implements electrical contacts 158, 159. These electrical contacts 158, 159 may be associated with different voltages such that the voltage difference drives the heating current. Hence, the heating current is fed to the SMA wires 151, 152 via the electrical contacts implemented by the crimped connection. While in the example of FIG. 13 the electrical contacts 158, 159 are implemented by the crimped connection, in other examples, dedicated electrical contacts remote from the crimped contacts could be provided.

Figure 15:
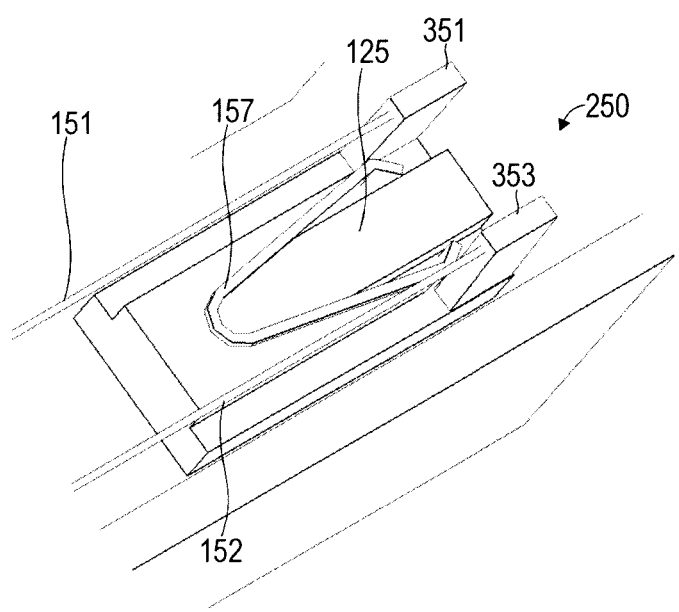
FIG. 15 illustrates details with respect to the limit switch of the valve of FIG. 13 according to various examples.

In order to support the heating current to flow between the electrical contacts of the two SMA wires 151, 152, the SMA wires 151, 152 can be electrically connected at the respective ends close to the plunger 125. This is illustrated in FIG. 15. FIG. 15 is a detailed view of the valve 100 of the example of FIGS. 13 and 14. In particular, FIG. 15 illustrates the ends 351, 353 of the SMA wires 151, 152 arranged adjacent to the plunger 125. For example, the ends 351, 353 could be implemented by a crimped connection with the plunger 125.

FIG. 15 illustrates aspects with respect to a limit switch 250. The limit switch 250 selectively provides the electric connection between the ends 351, 353 depending on the displacement 99 of the plunger 125. If the limit switch 250 is activated—i.e., if the electrical contact is broken or cut—, the heating current is cut. For this, a conductor 157 is arranged between the ends 351, 353 and rigidly coupled with the plunger 125. For example, the plunger 125 is moved beyond the open position 92, the conductor 157 loses contact with at least one of the ends 351, 353 due to the displacement 99; then, the heating current cannot flow between the electrical contacts associated with the SMA wires 151, 152. This causes a reduction of the temperature of the SMA wires 151, 152 and thereby a reduction of the actuation force 155. Due to the bias force 161A, there is a tendency for the plunger 125 to return to its closed position 91. By activating the limit switch 250 directly via the displacement of the plunger 125, a simple yet effective and failsafe overload protection mechanism can be implemented.

For example, the conductor 157 may provide shape-induced and/or material-induced elasticity. Thereby, a spring-loaded limit switch 250 may be implemented. This may help to reliably actuate the limit switch 250.

Figure 16:
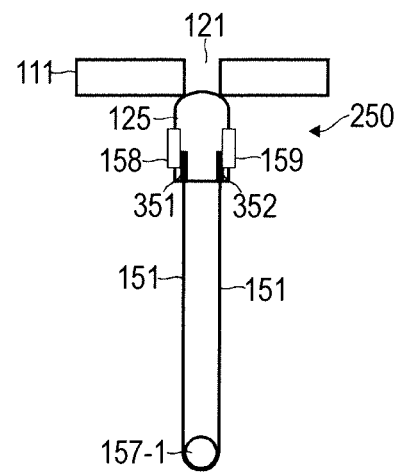
FIG. 16 is a schematic illustration of a valve including a SMA wire and a limit switch according to various examples, wherein in the example of FIG. 16 the limit switch is not activated.
Figure 17:
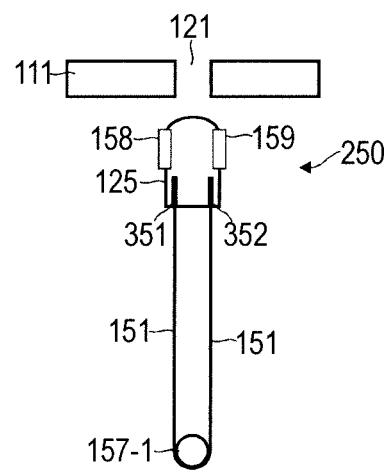
FIG. 17 is a schematic illustration of the valve of FIG. 16, wherein in the example of FIG. 17 the limit switch is activated.

FIGS. 16 and 17 illustrate aspects with respect to the limit switch 250. Again, in the example of FIGS. 16 and 17, the limit switch 250 is actuated by the displacement 99 of the plunger 125. FIGS. 16 and 17 illustrate an example where a single U-shaped SMA wire 151 is employed. The ends 351, 352 of the SMA wire 151 are both coupled with the plunger 125.

FIG. 16 illustrates a state in which the plunger 125 is in the closed position 91. Here, the fluid port 121 is sealed. Furthermore, the ends 351, 352 are in contact with static electrical contacts 158, 159. A voltage difference may be present between the electrical contacts 158, 159. Then, the heating current is fed to the SMA wire 151 via the electrical contacts 158, 159.

This causes contraction of the SMA wire 151. The plunger 125 is moved to the opened position 92, as illustrated in FIG. 17. The electrical contacts 158, 159 remain stationary within the reference frame of the housing 111; then, eventually, the ends 351, 352 lose contact with the electrical contacts 158, 159 such that the heating current is cut. For example, the arrangement of the electrical contacts 158, 159 with respect to the ends 351, 352 can be such that the limit switch 250 is actuated by displacement of the plunger 125 beyond the opened position 92. This helps to avoid overstress imposed on the SMA wire 151.

II) Stress-Strain Characteristics

Figure 18:
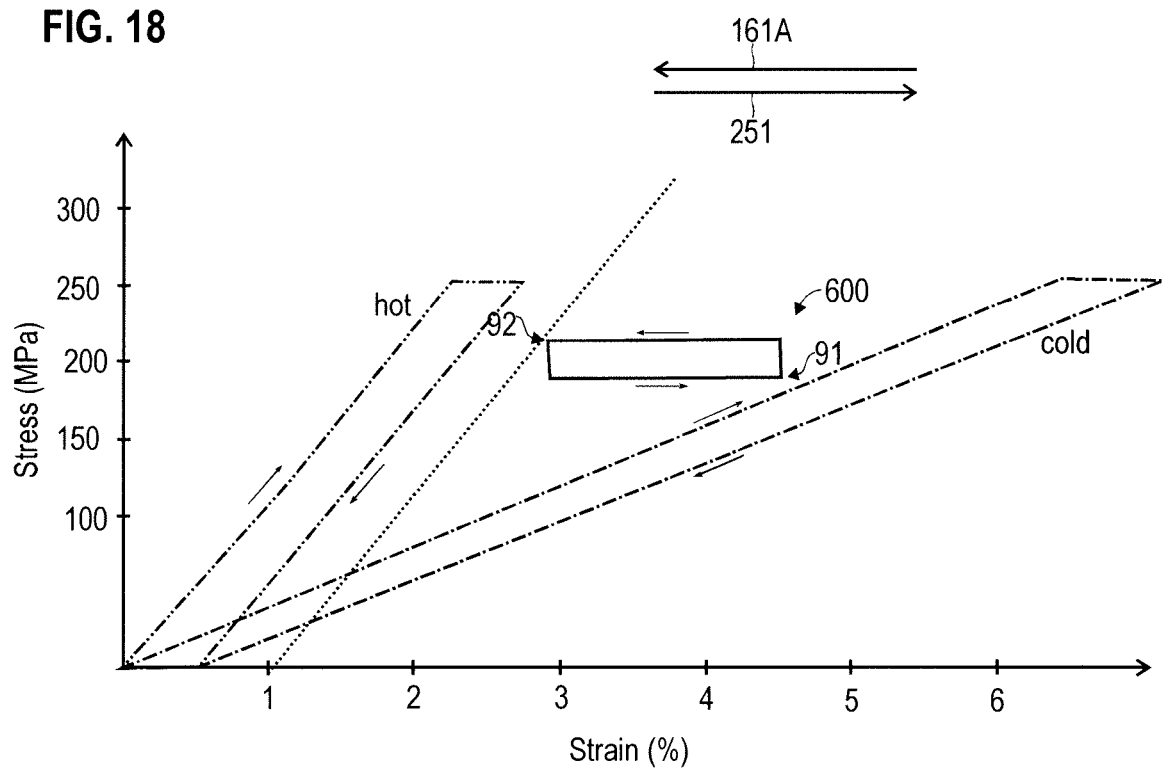
FIG. 18 illustrates the stress-strain characteristic of a SMA material according to various examples and further illustrates an operating range of a respective SMA wire of a valve according to various examples, wherein the valve includes a forward-force bias resilient member.

FIG. 18 illustrates an example stress-strain characteristic according to which the various valves 100 described herein may operate. FIG. 18 illustrates the stress imposed on the SMA material as a function of the strain. In particular, FIG. 18 illustrates the stress-strain characteristic for different temperatures. Here, different temperatures can correspond to different solid-state phases. FIG. 18 illustrates an example stress-strain characteristic of the SMA material formed into a SMA wire having a diameter of 76 μm. The SMA material is a NiTi alloy.

FIG. 18 illustrates two reference stress-strain characteristics. A first reference stress-strain characteristic is labeled as "cold" (dashed-dotted line) and corresponds to the stress-strain characteristic observed if the temperature is below a transition temperature such that the entire SMA material adheres a first solid-state phase. For example, typical SMA materials may implement the "cold" stress-strain characteristic in a fully martensitic phase. A second reference stress-strain characteristic is labeled as "hot" (dashed-dotted-dotted line) and corresponds to the stress-strain characteristic observed if the temperature is above the transition temperature such that the entire SMA material adheres to the second solid-state phase different from the first solid-state phase. For example, typical SMA materials may implement the "hot" stress-strain characteristic in a fully austenitic phase. From a comparison of the first and second reference stress-strain characteristics, it is apparent that the SMA material contracts for increasing temperature: the strain reduces. For temperatures close to the transition temperature, a mix between the first and second solid-state phases may be observed in the SMA material (not illustrated in FIG. 18)

From FIG. 18, it is apparent that there is a tendency that the stress increases for increasing strain. Typically, if the stress exceeds a certain threshold, the deformation of the SMA material is non-reversible and damage occurs. Therefore, according to examples, the operating range 600 according to which the valve 100 is operated is tailored so that the stress remains below an appropriate threshold. For example, it has been observed that care should be taken to not situate the operating range 600 beyond a certain safety margin (dotted line in FIG. 18) with respect to the hot curve. In particular, for large cycle counts there can be a tendency towards damage otherwise.

From FIG. 18 it is, furthermore, apparent that the deformation of the SMA material exhibits a hysteresis. Often, this hysteresis is considered in system design, but not necessarily employed to tailor the actuation of the valve.

FIG. 18 illustrates the operating range 600 of the SMA wire 151, 152 according to example implementations of the valve 100. In FIG. 18, the stress-strain states corresponding to the closed position 91 and the opened position 92 of the plunger 125, 125-1 are illustrated. For example, a smaller strain corresponds to a shorter length 251 of the SMA wire 151, 152. Increasing the strain of the SMA wire 151, 152 corresponds to increasing the length 251 of the SMA wire 151, 152—and, thereby, reducing the actuation force 155 on the plunger 125, 125-1. For example, the transition from the opened position 91 to the closed position 92 can be achieved by heating the SMA wire 151, 152; and the transition from the closed position 92 to the opened position 91 can be achieved by reducing the temperature the SMA wire 92.

In the example of FIG. 18, the stress experienced by the SMA wire 151, 152 is tailored by the geometry of the resilient member 161 as well as tailored by the arrangement of the resilient member 161 with respect to the plunger 125, 125-1 and/or the SMA wire 151, 152. In particular, as illustrated in FIG. 18, the stress remains relatively constant in the range of approximately 270 MPa-310 MPa. Generally, for a single-sided valve, the stress may be in the range of 173 MPa-245 MPa; and for a double-sided valve, the stress may be in the range of 270 MPa-310 MPa. Generally, it would be possible to operate the SMA wire 151, 152 at stresses of not less than 160 MPa, optionally of not less than 173 MPa. At the same time, damage to the SMA wire 151, 152 due to over-stress is avoided.

The flat stress profile may be achieved by tailoring the bias force 161A to match the general stress-strain characteristics of the SMA material. The general stress-strain characteristics define that a reduction of the length 251 of the SMA wire 151, 152 due to the phase transition results in a reduction of the strain (e.g., as can be seen from a comparison of the cold curve with the hot curve). At the same time—due to the forward force bias—the bias force 161 increases if the length 251 reduces. Thus, the general reduction of the strain due to heating is approximately compensated by the increase of the bias force 161 which causes a flat stress dependency on the strain.

By appropriately tailoring the operating range 600 with respect to the stress, it is possible to obtain higher activation temperatures and/or higher deactivation temperatures for switching the valve 100. This may be of particular help in an automotive requirement where generally high temperatures can be observed.

In the example of FIG. 18, the operating range 600 covers strains in the range of 3.7-5.4%. Generally, the valve 100 may be configured to operate the SMA wire 151, 152 it strains in the range of 2%-7%, optionally in the range of 3%-6%, further optionally in the range of 3.5%-5.5%.

For example, the change of the strain covered by the operating range 600 (1.7% in the example of FIG. 18) may correlate with the change of the length 251 of the SMA wire 151, 152, e.g., in a one-to-one manner.

In FIG. 18, the safety margin is illustrated by the dotted line. The safety margin is offset from the hot curve by approximately 1 percentage points of strain. For example, the valve 100 may be configured to operate the SMA wire 151, 152 at the operating range 600 which is offset at least 0.2 percentage points of strain from the hot curve, optionally at least 0.7 percentage points, further optionally at least one percentage point. This avoids damage even in presence of tolerances in high-volume production including variation from part to part. Thereby, fully reversible operation according to the extrinsic two-way effect can be achieved.

Figure 19:
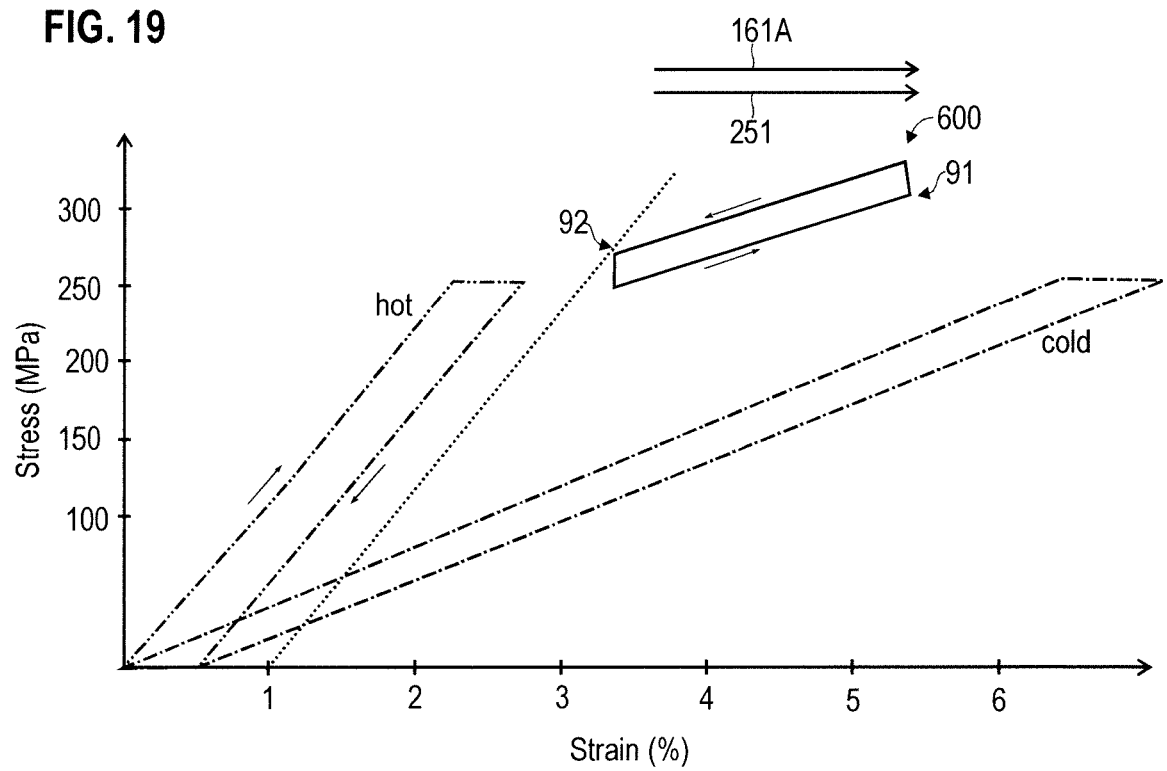
FIG. 19 illustrates the stress-strain characteristic of a SMA material according to various examples and further illustrates an operating range of a respective SMA wire of a valve according to various examples, wherein the valve includes a forward-force bias resilient member.

FIG. 19 illustrates an example stress-strain characteristic of the SMA material formed into a SMA wire having a diameter of 76 µm. The example of FIG. 19 generally corresponds to the example of FIG. 18. However, in the example of FIG. 19, a resilient member 161 providing a reversed force profile is used. For this reason, with decreasing length also the bias force 161A decreases (as illustrated by the parallel arrows in FIG. 19). This decreasing bias force 161A causes a reduction in the stress for increasing temperatures and decreasing strains. Thereby, the operating range 600—while still maintaining the safety margin—has a width of 3.2%-5.4% strain: this is significantly larger than achievable for the forward force bias (cf. FIG. 19). Thus, larger changes of the length 251 or higher stresses of the SMA wire 151, 152 may be achieved.

III) Valve Systems

Above, various examples have been described with respect to a single valve 100. For example, the single valve 100 could be a one-way valve or a two-way valve. For example, the single valve 100 could implement 2/2 valve functionality or 3/2 valve functionality.

According to the linear design in which the SMA wire 151, 152 is substantially parallel to the displacement direction 259 along a significant fraction of its length 251 or even along its entire length 251, it is possible to reduce the footprint of the housing 111. Furthermore, a characteristic geometry can be achieved for the housing 111: the housing 111 may be elongated having the long side surfaces 1111, 1112 extending along the SMA wire 151, 152. One or more fluid ports 121-123 can be arranged on the short side surfaces 1113, 1114 of the housing 111. Then, the SMA wire 151, 152 can be substantially parallel to a longitudinal axis 111A of the housing 111, e.g., along a significant fraction of its length 251 or even along its entire length 251.

Beyond the inherently small footprint of such a housing 111, it is also possible to implement valve systems using a plurality of such valves 100. Such valve systems—due to the elongated shape of the housing 111—can be implemented with a particularly small footprint, as well.

Figure 20:
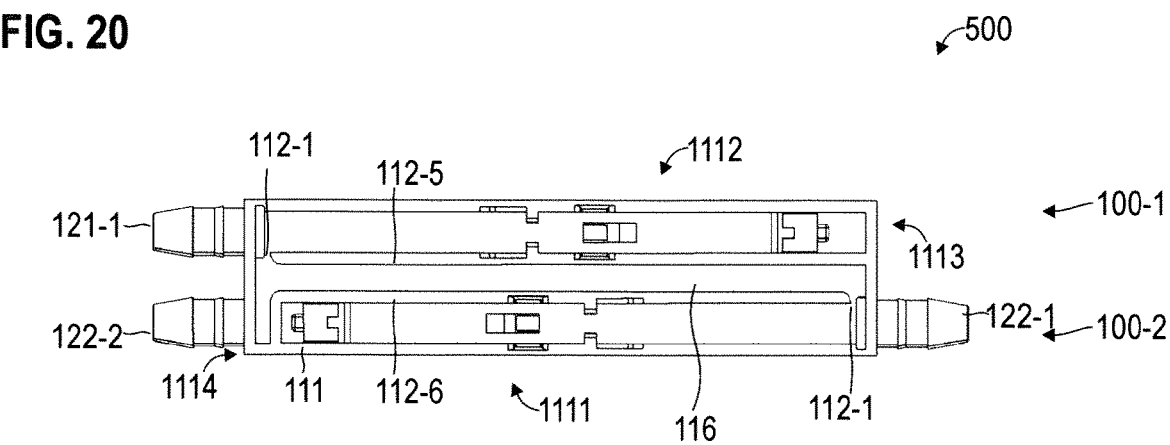
FIG. 20 schematically illustrates a valve system including multiple valves according to various examples.

FIG. 20 illustrates aspects with respect to a valve system 500. The valve system 500 includes a first valve 100-1 and a second valve 100-2. For example, the valve system 500 could implement a 2×2/2 valve functionality.

Each valve 100-1, 100-2 could be implemented according to techniques described herein, i.e., using a linear design of the SMA wire (not shown in FIG. 20) with respect to the displacement direction defined by the displacement of the respective plunger. Each valve 100-1, 100-2 could employ a stress-strain operating range 600 as discussed above.

For example, the valve 100-1 includes the fluid port 121-1. The valve 100-1 implements a one-way valve. In some examples, it could also be possible that the valve 100-1 includes one or more additional fluid ports (not illustrated in FIG. 20). A plunger can be actuated by a SMA wire in order to selectively seal the fluid port 121-1. For this, techniques can be implemented as described herein with respect to the valve 100.

The valve 100-2 also includes a fluid port 122-1. The valve 100-2 implements a one-way valve. For this, a plunger can be actuated by a SMA wire in order to selectively seal the fluid port 122-1. For this, techniques can be implemented as described herein with respect to the valve 100. The valve 100-2 also includes the fluid port 122-2. The fluid port 122-2, in the example of FIG. 20, is unsealed independent of the position of the plunger of the valve 100-2.

In FIG. 20, the valve system 500 includes a fluid flow path 116. The fluid flow path 116 is in between the valves 100-1, 100-2. The fluid flow path 116 is arranged in between the valves 100-1, 100-2. The fluid flow path 116 connects the various fluid ports 121-1, 122-1, 122-2.

In the example of FIG. 20, the SMA wires of the valves 100-1, 100-2 are arranged substantially in parallel, i.e., include an angle of approximately 0° with respect to each other. Generally, it would be possible that the SMA wires of the valves of the valve system include an angle of not more than 50° with each other, optionally of not more than 5°, further optionally of not more than 1°.

As will be appreciated from FIG. 20, due to the elongated shape of each one of the valves 100-1, 100-2 implementing the linear design in which the SMA wires extends substantially in parallel to the displacement direction of the respective plunger, it becomes possible to implement the housing 111 of the valve system 500 having comparably small dimensions. The height of the configuration can be less than 15 mm, optionally less than 10 mm, further optionally less than 6 mm.

Furthermore, the design offers the potential of increased modularity. For example, it could be desired to implement another valve functionality instead of the 2×2/2 valve functionality of the valve system 500 according to the example of FIG. 20. This can be done by reconfiguring the screens 112-5, 112-6 used in order to define the fluid flow path 116. For example, the implementation of FIG. 20 employs two screens 112-5, 112-6. The screen 112-5 extends along the SMA wire of the valve 100-1 (in FIG. 20 the SMA wire is not illustrated). The screen 112-6 extends along the SMA wire of the valve 100-2 (in FIG. 20 the SMA wire is not illustrated). The screen 112-5 includes an opening 112-1 adjacent to the fluid port 121-1; depending on the respective plunger position, the fluid flow path 116 is then selectively coupled with the fluid port 121-1. Likewise, the screen 112-6 includes an opening 112-1 adjacent to the fluid port 122-1; depending on the respective plunger position, the fluid flow path 116 is then selectively coupled with the fluid port 122-1. The fluid port 122-2 is coupled with the fluid flow path 116 independent of the position of the plunger.

Figure 21:
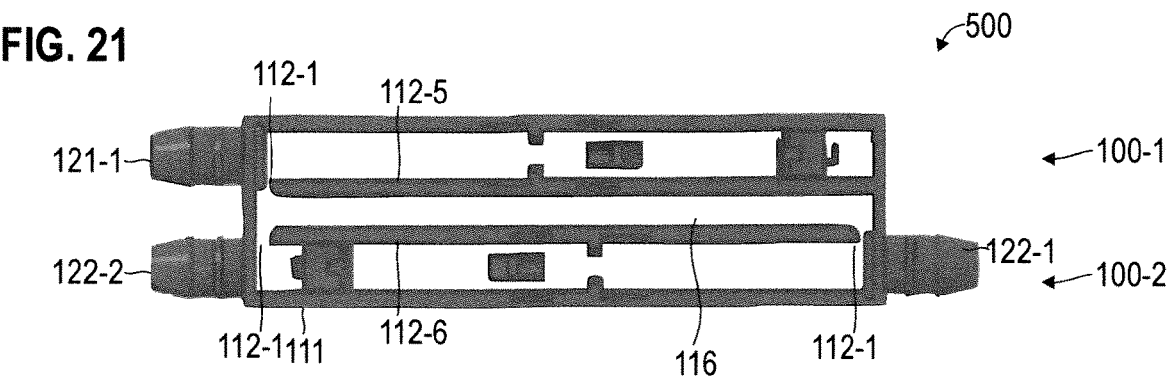
FIG. 21 schematically illustrates a valve system including multiple valves according to various examples.

FIG. 21 illustrates aspects with respect to the valve system 500. Here, the general shape and design of the housing 111 corresponds to the general shape and design of the housing 111 of the valve system 500 according to the example of FIG. 20. However, the interior design of the valve system 500 in the example of FIG. 21 is different from the interior design of the valve system 500 in the example of FIG. 20. Here, the valve 100-2 is a two-way valve including two plungers configured to selectively seal the fluid ports 122-1, 122-2. For implementing the two-way valve 100-2, for example, techniques as described herein using a coupling in between the respective plungers could be used. Also, the screen 112-6 includes an additional opening 112-1 adjacent to the fluid port 122-2. The valve system 500 of the example of FIG. 21 implements a 3/2 into 2/2 valve functionality.

Figure 22:
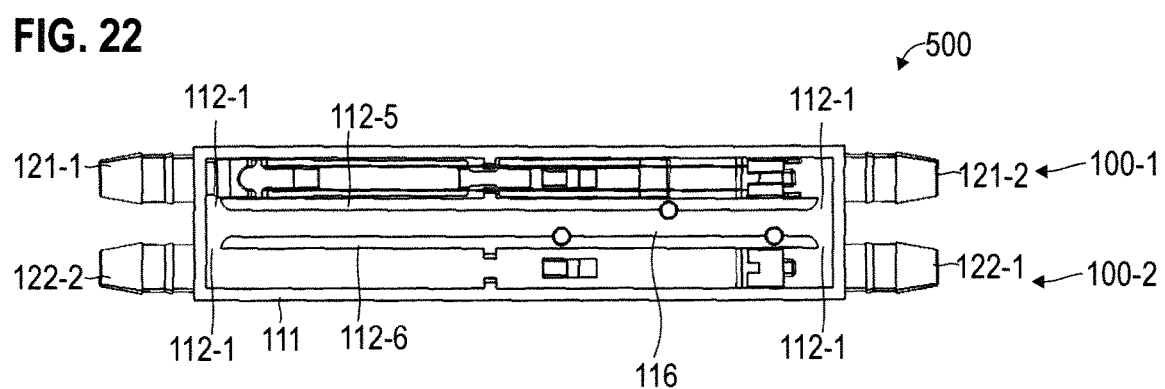
FIG. 22 schematically illustrates a valve system including multiple valves according to various examples.

FIG. 22 illustrates aspects with respect to the valve system 500. Here, the general shape and design of the housing 111 corresponds to the general shape and design of the housing 111 of the valve system 500 according to the example of FIG. 20. However, the interior architecture of the valve system 500 in the example of FIG. 22 is different from the interior architecture of the valve system 500 in the example of FIG. 20. Here, the valve 100-1, as well as the valve 100-2 are two-way valves, each including two plungers configured to selectively seal the fluid ports 121-1, 121-2 and 122-1, 122-2, respectively. The valve system 500 of the example of FIG. 22 implements a 4/4 valve functionality.

Figure 23:
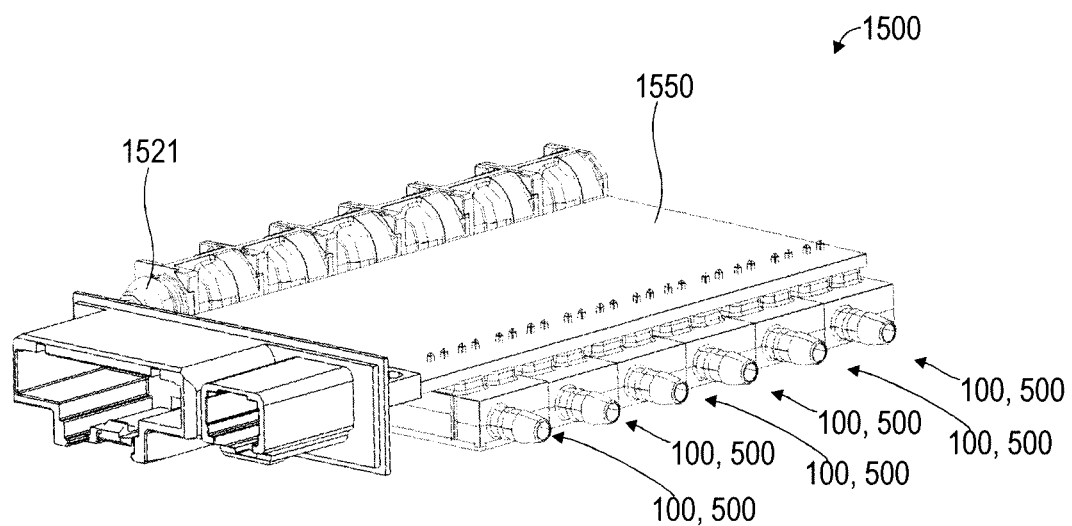
FIG. 23 schematically illustrates a valve module including multiple valves or valve systems according to various examples.

FIG. 23 illustrates aspects with respect to a valve module 1500. In some examples, it would also be possible to combine a plurality of the valves 100 and/or a plurality of the valve systems 500 as discussed herein in order to implement the valve module 1500. Here, it is not required that fluid flow paths interconnect the valves of different valve systems.

The valve module 1500 includes a common fluid port 1521. For example, pressurized air could be provided via the fluid port 1521 to each one of the valves 100 or valve systems 500. The valve module 1500 also includes data interfaces in order to receive control data which enables the system to individually switch each one of the valves 100 or valve systems 500. A common baseplate 1550, e.g., a printed circuit board (PCB), is provided which may provide fixture functionality to the plurality of valves 100 or valve systems 500. It would also be possible that the valves 100 of the valve system 500 have incorporated fixtures such as clip features such that the baseplate 1550 is not the load-bearing connection. Optionally, a microcontroller or another control logic for individually controlling the valves 100 or valve systems 500 may be attached to the common baseplate 1550.

The valves 100 and/or valve systems 550 are arranged adjacent to the common baseplate 1550. If the common baseplate 1550 includes electronic circuitry, the housings 111 of the valves 100 and/or valve systems 500 may provide protection functionality to the electronic circuitry.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while above various examples have been described with respect to SMA wires, similar techniques may also be employed for other kinds and types of SMA actuators such as SMA belts or SMA plates, etc.

For example, while above various examples have been described with respect to valves having a fully opened and a fully closed position of the plunger, also valves employing positions which partially obstruct the fluid flow can be implemented using the techniques described herein.

LIST OF REFERENCE NUMERALS 91 closed position
92 opened position
99 displacement of plunger
99-1 displacement of plunger
99-2 displacement of plunger
100 valve
100-1 valve
100-2 valve
111A longitudinal axis of housing
111 housing
112 screen
112-1 screen opening
112-5 screen
112-6 screen
116 fluid flow path
121 fluid port
121-1 fluid port
121-2 fluid port
122-1 fluid port
122-2 fluid port
122 fluid port
123 fluid port
125 plunger
125-1 plunger
125-2 plunger
125-5 extension rod of plunger
125X offset
126 coupling
126-1 extension of plunger
126-2 extension of plunger
126-3 engagement surface
151 SMA wire
152 SMA wire
155 actuation force
157 conductor
157-1 fixture
158 electrical contact
159 electrical contact
161 resilient member
161A bias force
161B leaf spring middle portion
161C leaf spring deflection
161D leaf spring longitudinal axis
162 resilient member
162A bias force
250 limit switch
251 length of SMA wire
259 displacement direction
351 end of SMA wire
352 end of SMA wire
353 end of SMA wire
354 end of SMA wire
355 middle region of SMA wire
360 segment
500 valve system
600 operating range
701 lever
801 wing
802 wing
805 center part
1111 long side surface of housing
1112 long side surface of housing
1113 short side surface of housing
1114 short side surface of housing
1500 valve module
1521 fluid port
1550 base plate

The invention claimed is:

1. A valve, comprising:
a housing,
a fluid port arranged in the housing,
a plunger configured to seal the fluid port in a first position and to unseal the fluid port in a second position and to displace along a displacement direction from the first position towards the second position,
a resilient member configured to exert a bias force on the plunger, wherein the resilient member comprises a leaf spring shaped to exert the bias force having a reversed force profile, and
at least one shape memory alloy actuator extending along the displacement direction for at least 50% of a length of the at least one shape memory alloy actuator, the shape memory alloy actuator configured to exert an actuation force on the plunger to displace the plunger from the first position towards the second position.

2. The valve of claim 1, wherein the leaf spring has a longitudinal axis which extends along the displacement direction, and wherein the leaf spring has a tapered middle portion.

3. The valve of claim 2, wherein the tapered middle portion is configured to deflect away from the at least one shape memory alloy actuator or towards the at least one shape memory alloy actuator.

4. The valve of claim 1, wherein the leaf spring has a longitudinal axis which extends along the displacement direction, and wherein the leaf spring has a widened middle portion.

5. The valve of claim 1, wherein the leaf spring comprises one or more tilted wings extending from a center part of the leaf spring.

6. The valve of claim 1, further comprising:
a further fluid port,
wherein the shape memory alloy actuator extends between the fluid port and the further fluid port for at least a part of a full length of the shape memory alloy actuator.

7. The valve of claim 6, wherein the part is at least 50% of the full length of the shape memory alloy actuator.

8. The valve of claim 6, wherein the part is at least 90% of the full length of the shape memory alloy actuator.

9. The valve of claim 1, wherein the housing comprises a fluid flow path configured to guide a fluid with respect to the fluid port.

10. The valve of claim 9, further comprising:
a screen extending along the at least one shape memory alloy actuator and delimiting an inner compartment of the housing in which the at least one shape memory alloy actuator is arranged from the fluid flow path.

11. The valve of claim 10, wherein the inner compartment is fluidly coupled with the fluid flow path.

12. The valve of claim 9, wherein the shape memory actuator extends in the fluid flow path.

13. The valve of claim 1, further comprising:
an electrical contact configured to feed a heating current to the at least one shape memory alloy actuator, and
a limit switch activated by displacement of the plunger beyond the second position and configured to cut the heating current.

14. The valve of claim 1, further comprising:
a further fluid port,
a further plunger configured to seal the further fluid port in a first position and to unseal the further fluid port in a second position and to displace along a displacement direction of the further plunger from the second position of the further plunger towards the first position of the further plunger, and
a coupling configured to at least partially translate the displacement of the plunger into the displacement of the further plunger,
wherein the coupling comprises a lever.

15. The valve of claim 14, wherein the lever comprises an engagement surface configured to engage with the plunger for at least a part of the displacement of the plunger.

16. The valve of claim 1, wherein the housing is elongated along a longitudinal axis and has a first side surface and a second side surface which is longer than the first side surface, wherein the fluid port is arranged at the first side surface, wherein the longitudinal axis and the displacement direction enclose an angle of less than 10°.

17. The valve of claim 16, wherein the longitudinal axis and the displacement direction enclose an angle of less than 2°.

18. The valve of claim 16, wherein the longitudinal axis and the displacement direction enclose an angle of 0°.

19. A valve, comprising:
a housing,
a fluid port arranged in the housing,
a plunger configured to seal the fluid port in a first position and to unseal the fluid port in a second position and to displace along a displacement direction from the first position towards the second position, and
at least one shape memory alloy actuator extending along the displacement direction for at least 50% of a length of the at least one shape memory alloy actuator and configured to exert an actuation force on the plunger to displace the plunger from the first position towards the second position,
wherein the at least one shape memory alloy actuator has a first end coupled to the plunger and further has a second end also coupled to the plunger.

20. The valve of claim 19, wherein the shape memory alloy actuator is arranged in a U-shape.

21. The valve of claim 19, further comprising:
a connection piece arranged in-between at least one end of the at least one shape memory alloy actuator and the plunger,
wherein the connection piece is configured to provide a transmission ratio between a length change of the at least one shape memory alloy actuator and the displacement of the plunger between the first position and the second position of 1:1±10%.

22. The valve of claim 19, wherein the at least one shape memory alloy actuator comprises a first shape memory alloy actuator and a second shape memory alloy actuator,
wherein the valve further comprises:
a segment arranged between two adjacent ends of the first shape memory alloy actuator and the second shape memory alloy actuator.

23. A valve, comprising:
a housing,
a fluid port arranged in the housing,
a plunger configured to seal the fluid port in a first position and to unseal the fluid port in a second position and to displace along a displacement direction from the first position towards the second position,
at least one shape memory alloy actuator extending along the displacement direction for at least 50% of a length of the at least one shape memory alloy actuator and configured to exert an actuation force on the plunger to displace the plunger from the first position towards the second position,
a further fluid port,
a further plunger configured to seal the further fluid port in a first position and to unseal the further fluid port in a second position and to displace along a displacement direction of the further plunger from the second position of the further plunger towards the first position of the further plunger, and a coupling configured to at least partially translate the displacement of the plunger into the displacement of the further plunger, wherein the coupling comprises a lever having an engagement surface configured to engage with the plunger for at least a part of the displacement of the plunger.

24. The valve of claim 23,
wherein the displacement direction of the further plunger is rotated with respect to the displacement direction of the plunger by 90°±45°.

25. The valve of claim 23,
wherein the displacement direction of the further plunger is rotated with respect to the displacement direction of the plunger by 90°±25°.

26. A valve, comprising:
a housing,
a fluid port arranged in the housing,
a plunger configured to seal the fluid port in a first position and to unseal the fluid port in a second position and to displace along a displacement direction from the first position towards the second position,
at least one shape memory alloy actuator extending along the displacement direction for at least 50% of a length of the at least one shape memory alloy actuator and configured to exert an actuation force on the plunger to displace the plunger from the first position towards the second position,
a further fluid port,
a further plunger configured to seal the further fluid port in a first position of the further plunger and to unseal the further fluid port in a second position of the further plunger and to displace along a displacement direction of the further plunger from the second position of the further plunger towards the first position of the further plunger,
a coupling configured to at least partially translate the displacement of the plunger into the displacement of the further plunger, and
a resilient member configured to exert a bias force on the plunger,
wherein the coupling is configured to transmit the bias force to the further plunger and to not transmit the actuation force to the further plunger.

27. The valve of claim 26, further comprising:
a further resilient member configured to exert a further bias force on the further plunger.

28. The valve of claim 27, further comprising:
wherein the bias force is larger than the further bias force.

29. The valve of claim 27,
wherein the further resilient member is coupled with the further plunger via the coupling.

30. The valve of claim 27,
wherein the coupling is configured to not transmit the further bias force to the plunger when the plunger is in the first position.

31. The valve of claim 27,
wherein the coupling is configured to transmit the further bias force to the plunger when the plunger is in the second position.

* * * * *